United States Patent
Bang et al.

(10) Patent No.: US 8,781,924 B2
(45) Date of Patent: Jul. 15, 2014

(54) REMOTE PROGRAM DEVELOPMENT MEDIATION SYSTEM AND METHOD FOR MEDIATING A PROGRAM DEVELOPMENT CONTRACT AND DEVELOPMENT OF PROGRAM USING VIRTUAL DEVELOPMENT ENVIRONMENT OF CLIENT

(76) Inventors: Inn-Sung Bang, Yongin-si (KR); Hae-Ryung Kim, Seongnamsi (KR)

( * ) Notice: Subject to any disclaimer, the term of this patent is extended or adjusted under 35 U.S.C. 154(b) by 130 days.

(21) Appl. No.: 13/590,681

(22) Filed: Aug. 21, 2012

(65) Prior Publication Data

US 2013/0046585 A1 Feb. 21, 2013

Related U.S. Application Data

(63) Continuation of application No. PCT/KR2011/000995, filed on Feb. 16, 2011.

(30) Foreign Application Priority Data

Feb. 23, 2010 (KR) .......................... 10-2010-0016304
Jan. 18, 2011 (KR) .......................... 10-2011-0005079

(51) Int. Cl.
 *G07B 17/00* (2006.01)
 *G06F 9/44* (2006.01)
 *G06Q 10/00* (2012.01)

(52) U.S. Cl.
 CPC ...................................... *G06F 8/20* (2013.01)
 USPC .................................................. 705/30; 705/9

(58) Field of Classification Search
 USPC ............................................................. 705/30
 See application file for complete search history.

(56) References Cited

U.S. PATENT DOCUMENTS

| 8,296,720 | B2 * | 10/2012 | Coulthard et al. ............ 717/103 |
| 2005/0120335 | A1 | 6/2005 | Kelley et al. |
| 2009/0106731 | A1 * | 4/2009 | Coulthard et al. ............ 717/101 |
| 2009/0240552 | A1 * | 9/2009 | Yang et al. ........................ 705/9 |

FOREIGN PATENT DOCUMENTS

| KR | 10-2001-0038541 A | 5/2001 |
| KR | 10-2001-0092718 A | 10/2001 |
| KR | 10-2007-0104099 A | 10/2007 |
| KR | 10-2009-0030149 A | 3/2009 |

* cited by examiner

*Primary Examiner* — Garcia Ade
(74) *Attorney, Agent, or Firm* — Sherr & Jiang, PLLC

(57) ABSTRACT

Disclosed is a remote program development mediation system and method for enabling remote program development by mediating a program development contract between a development consignor and a developer, constructing the development environment of a developer terminal for developing a program in a Client/Server (C/S) environment in a virtualization server, and allowing a virtualization server to provide the developer terminal with a development tool image of a virtualized development framework. When a consignor requests a plurality of development pools to develop programs, a chronic difficulty to secure developers can be solved, and developers can develop programs remotely.

20 Claims, 31 Drawing Sheets

Fig. 7

| Table No | Relevant Table Name | Major contents of tables |
|---|---|---|
| T1 | Development information table | • Table including basic information of "development consignor request program development |
| T2 | Development pool information table | • Table including basic information, trust details, and information about trust level of trust institutes registered with "development pool" |
| T3 | Development pool trust result evaluation table | • Table including evaluation details for development results trusted and developed by "development pool" |
| T4 | Development trust receipt/approval table | • Table including request information about development consignment details requested by "development consignor", results about whether consignment received by "program development Hub" is possible, and approval information |
| T5 | Development environment information table | • Table including development environment for development consignment details requested by "development consignor" (server development environment and client development environment) |
| T6 | Development trust receipt/approval table | • Table including request information about development trust details requested by "development pool", results about whether trust received by "program development Hub" is possible, and approval information |
| T7 | Development contract confirmation table | • Table including detailed information about contract when the contract is concluded between "development consignor" and "development pool" |
| T8 | Development payment management table | • Table including information about calculation of development costs and demand for development case on which contract has been made and information about results of payment |
| T9 | Target development program information table | • Table including information about target development for development case on which contract has been made and development, test, and approval for each program |
| T10 | Consignment and development pool manager/developer information table | • Table including login information about "development consignor, manager of "development pool", and developer for development case on which contract has been made |
| T11 | Development progress information summary table | • Table including development progress result summary information for development case on which contract has been made |
| T12 | Development progress bulletin board information table | • Table including issues during development between "development consignor, "program development Hub", and "development pool" for development case on which contract has been made |
| T13 | Various code information table | • Table including various pieces of code information used in each information table |

FIG. 8A

■ (T1)Development consignor information table

| Consignor ID | Business enterpriser No | Consigner No | URL | Business corporate type | Credit Grade | Representative name | Representative Telephone No. | Last receipt No. | Request Number | Rejection Number |
|---|---|---|---|---|---|---|---|---|---|---|
| S_SDS | 1234567890 | Samsung SDS | Sds.sam | A01 | A+ | Kim In | 02-1234-1234 | 0023 | 22 | 1 |
| S_SKCNC | 2345678123 | SK C&C | Skcnc.com | A01 | A+ | Choi Byoung-choi | 02-4567-0987 | 0118 | 116 | 2 |
| S_LGCNS | 2134837564 | LG CNS | Lgcns.com | A02 | A+ | Hong Gap-sa | 02-1080-1100 | 0029 | 28 | 1 |
| S_HIT | 8676765439 | HIT Information Technology | Hit.com | A03 | A | Lee Yeong-cheol | 02-3740-2315 | 0014 | 9 | 5 |
| S_POSDATA | 4758938123 | POS DATA | Posdata.com | A02 | A | Han Dong-wook | 031-1234-6856 | 0012 | 12 | 0 |

FIG. 8B

■ (T2) Development pool information table

| Trustee name | Business enterpriser No | Trustee name | URL | Business corporate type | Credit Grade | Representative name | Representative Telephone No. | Last receipt No. | Number of trusts | Rejection Number | Included Developers | Available Manpower | Number of Problems | Trust Reliability Grade | Development Pool Location |
|---|---|---|---|---|---|---|---|---|---|---|---|---|---|---|---|
| DP_DKU | 12345 67894 | Dankook University IT lesson | DKU.org | A01 | A+ | Kim young-An | 031-1234-1234 | 0007 | 5 | 2 | 240 | 80 | 1 | A | B01 |
| DP_SKU | 38483 84937 | Seokang University IT lesson | SKU.org | A01 | A+ | Kim Dong-cheol | 02-3333-1212 | 0012 | 8 | 4 | 480 | 160 | 2 | B+ | B01 |
| DP_YSU | 29384 75834 | Yensei University IT lesson | YSU.org | A02 | A+ | Park Sang-pil | 02-3498-0003 | 0029 | 17 | 12 | 640 | 160 | 1 | B+ | B11 |
| DP_eurim | 87656 57546 | Woorim Information Communication | Eurim.com | A03 | A | Jeong Soo-young | 02-2380-3456 | 0003 | 2 | 1 | 75 | 10 | 1 | A | B03 |
| DP_INTRO | 94721 34637 | INTRO information | Intro.com | A02 | A | Nam Hee-gap | 02-1289-1289 | 0048 | 39 | 9 | 430 | 120 | 0 | A+ | B02 |

FIG. 8C

(T3) Development pool trust result evaluation table

| Trustee ID | Receipt No | Consignor ID | Receipt No | Automatic evaluation contents of actually developed program ||||| Development consignor evaluation contents |||
|---|---|---|---|---|---|---|---|---|---|---|
| | | | | Evaluation A grade number of copies /% | Evaluation B grade number of copies /% | Evaluation C grade number of copies /% | Evaluation D grade number of copies /% | Total evaluation grade | Evaluation results | Development trust evaluation summary | Problematic reason |
| DP_DKU | 0004 | S_SKCNC | 0118 | | | | | | B | Develop without special problem, but there was some delay of 10% | C01 |
| DP_DKU | 0007 | S_SDS | 0023 | 700 copies/58% | 320 copies/27% | 150 copies/13% | 30 copies/2% | A | A | Generally develop without special problem | |
| DP_YSU | 0006 | S_LGCNS | 0012 | | | | | | B+ | Generally lack in responsibility and low quality | C03 |

FIG. 9A

■ (T4) Development consignment receipt/approval table

| Con sign or ID | Rece ipt No | Dat e of rece ipt | Rece ipt IP | Requ ester name | Re qu est er e-ma il | Requ ester telep hone | Relevant Pjt name | Req ues ted vol um e | Reques ted amoun t limit (thous ands) | Dev elo pm ent star t fro m | Dev elo pm ent end To | Pay me nt con diti on | Pe na lty co nd iti on | Pro ject Loc atio n | Ap pr ov ed? | Reas on of rejec tion | stat us | Noti ce? |
|---|---|---|---|---|---|---|---|---|---|---|---|---|---|---|---|---|---|---|
| S_S DS | 0023 | 200 902 12 | 203. 123. 12 | Lee Cheol -Jae | lcj @ | 010- 1234 - 1234 | Hana Card Pjt | 1,2 00 | 300,00 0 | 200 903 01 | 200 907 31 | D0 1 | E0 1 | B01 | Ye s | | G03 | Yes |
| S_SK CNC | 0118 | 200 903 04 | 128. 123. 4.12 | Hong Gil- Dong | | 010- 2345 - 2345 | SK Securitie s Pjt | 1,4 00 | 350,00 0 | 200 903 16 | 200 908 15 | D0 1 | E0 1 | B01 | No | F01 | G01 | Yes |
| S_LG CNS | 0029 | 200 903 12 | 302. 23.4 5.18 | Kim Han- Kook | | 010- 8765 - 3214 | Shinhan Bank Pjt | 750 | 187,50 0 | 200 904 01 | 200 906 30 | D0 2 | E0 2 | B11 | | | | |
| S_HI T | 0014 | 200 904 18 | 212. 23.3 4.12 | Seo Byou ng- Cheol | | 010- 3213 - 2398 | Asan Hospital Pjt | 600 | 150,00 0 | 200 905 01 | 200 908 31 | D0 2 | E0 2 | B02 | | | | |

FIG. 9B

■ (T5) Development environment information table

| Consignor ID | Receipt No | Present project stage | Number of developers | Server Arch | O/S | RDBMS | TP-Monitor or WAS | Development framework used | Whether DB I/O is possible? | Development language | Number of copies | A grade | B grade | C grade | D grade | S/W & Solution used in server |
|---|---|---|---|---|---|---|---|---|---|---|---|---|---|---|---|---|
| S_SDS | 0023 | Design | 50 | C/S | AIX | Oracle | Tuxedo | SYSTEMiER | Yes | C/C++ | 1000 | 10 | 400 | 490 | 100 | CB*tester |
| S_SKC&C | 0118 | Design | 60 | C/S | HP-UX | Oracle | TMAX | ProFrame 4.0 | Yes | C/C++ | 1400 | 0 | 600 | 800 | 0 | — |
| S_LGCNS | 0029 | Development | 70 | J2EE | AIX | Oracle | WebLogic | AnyFrame 3.0 | Yes | JAVA | 750 | 50 | 400 | 200 | 100 | — |
| S_HIT | 0814 | Design | 40 | C/S | HP-UX | Sybase | TMAX | ProFrame 3.0 | No | C/C++ | 600 | 0 | 450 | 150 | 0 | ChangeFlow |

FIG. 9C

■ (T5) Development environment information table (continued)

| Client Arch | O/S | Web Server | Framework used | Development language | Whether META is possible? | Number of copies | A grade | B grade | C grade | D grade | S/W&Solution used in Client | Special factors |
|---|---|---|---|---|---|---|---|---|---|---|---|---|
| C/S | Windows | NA | CSBuilder | Visual C++ | Yes | 200 | 0 | 150 | 50 | 0 | — | |
| Web | Windows | Apache | NA | JAVA | Yes | 0 | 0 | 0 | 0 | 0 | — | |
| Web | Windows | Apache | NA | JAVA | Yes | 0 | 0 | 0 | 0 | 0 | — | |
| Web | Windows | IIS | Anyframe JAVA | JAVA | Yes | 0 | 0 | 0 | 0 | 0 | — | |

FIG. 9D

■ (T6) Development trust receipt/approval table

| Trust ee ID | Recei pt No | Date of recei pt | Recei pt IP | Reci pient nam e | Reci pient e- mail | Reci pient telep hone | Cons ignor ID | Recei pt No | Esti mate d amo unt (tho usan ds) | Whe ther pay ment cond ition has been acce pted? | Whe ther pena lty has been acce pted? | Avail able man pow er | Acce ptan ce expe rienc e | Dead line date | Appr oved? | Reas on of rejec tion | status |
|---|---|---|---|---|---|---|---|---|---|---|---|---|---|---|---|---|---|
| DP_D KU | 0007 | 2009 0214 | 189. 31.1 3.23 | Kim Youn g-An | kya @dk u | 010- 1234 - 1234 | S_SD S | 0023 | 180, 000 | Yes | Yes | 80 | 5 | 2009 0731 | No | H01 | I03 |
| DP_S KU | 0012 | 2009 0214 | 231. 12.1 2.12 | Kim Don g- cheo | | 010- 2345 - 2345 | S_SD S | 0023 | 175, 000 | Yes | Yes | 160 | 8 | 2009 0731 | No | H02 | I03 |
| DP_Y SU | 0029 | 2009 0214 | 321. 34.1 2.32 | Park Sang -pil | | 010- 8765 - 3214 | S_SD S | 0023 | 180, 000 | Yes | Yes | 160 | 17 | 2009 0731 | Yes | | I02 |
| DP_e urim | 0003 | 2009 0214 | 108. 23.3 4.45 | Jung Soo- Youn g | | 010- 3213 - 2398 | S_SD S | 0023 | 180, 000 | Yes | Yes | 10 | 2 | 2009 0731 | No | H03 | I03 |
| DP_I NTR O | 0048 | 2009 0214 | 211. 12.1 2.31 | Nam Hee- Gap | | 010- 8769 - 3455 | S_SD S | 0023 | 177, 000 | Yes | Yes | 120 | 39 | 2009 0731 | No | H01 | I03 |

FIG. 10A

■ (T7) Development contract confirmation table

| Consig nor ID | Recei pt No | Trust ee ID | Rec eipt No | Contr act date | Releva nt project name | Cont ract No | Copi es of cont ract | Paym ent condit ion | Penalt y condi tion | Develo pment start date | Develo pment deadli ne date | Trust cont racto r | Acce ptan ce cont racto r | Cont ract amo unt | Hub rent al | Trus t amo unt |
|---|---|---|---|---|---|---|---|---|---|---|---|---|---|---|---|---|
| S_SDS | 0023 | DP_ DKU | 000 7 | 20090 222 | HanaS K Card Pjt | 200- 0429 | 1,20 0 | D01 | E01 | 200903 05 | 200907 31 | Kim In | Kim Yeon g-an | 300, 000 | 120, 000 | 180, 000 |
| S_SKC NC | 0118 | | | | | | | | | | | | | | | |
| S_LGC NS | 0029 | | | | | | | | | | | | | | | |
| S_HIT | 0014 | | | | | | | | | | | | | | | |
| S_POS DATA | 0012 | | | | | | | | | | | | | | | |

FIG. 10B

■ (T7) Development contract confirmation table (continued)

| Server A grade | Server B grade | Server C grade | Server D grade | Client A grade | Client B grade | Client C grade | Client D grade | Attachment | Special conditions | Development server access IP Address | Trustee bank | Trustee A/C | Trustee Name | Hub Bank | Hub A/C | Hub representative name | Trust amount payment sum | Hub rental payment sum |
|---|---|---|---|---|---|---|---|---|---|---|---|---|---|---|---|---|---|---|
| 10 | 400 | 490 | 100 | 0 | 150 | 50 | 0 | Signed contract file | | http://203.112.12.23 | Kook-min Bank | 081-99-3364712 | Kim Yeong-an | Kook-min Bank | 023-12-2345632 | Kim He-ryoung | | |
| | | | | | | | | | | | | | | | | | | |
| | | | | | | | | | | | | | | | | | | |
| | | | | | | | | | | | | | | | | | | |

FIG. 10C

■ (T8) Development payment management table

| Consignor ID | Receipt No | Classification code | Trustee/Hub ID | Receipt No | Scheduled Payment Date | Scheduled Payment Amount | Demand Request Date | Planned Number of Copies | Resulting Number of Copies | Result ratio | Demand/payment amount | Agreed payment Date | Actual Payment Date | Paid? | Reason of arrears | Scheduled payment date upon arrears | Marks |
|---|---|---|---|---|---|---|---|---|---|---|---|---|---|---|---|---|---|
| S_SDS | 0023 | 1 | DP_D_KU | 0007 | 20090331 | 100000 | 20090331 | 100 | 80 | 80% | 80000 | 20090405 | 20090412 | No | J01 | 20090412 | |
| S_SDS | 0023 | 1 | DP_D_KU | 0007 | 20090531 | 100000 | 20090531 | 100 | 110 | 110% | 11000 | | | No | | | |
| S_SDS | 0023 | 1 | DP_D_KU | 0007 | 20090815 | 100000 | 20090815 | 100 | 90 | 90% | 90000 | | | No | | | |
| S_SDS | 0023 | 1 | DP_D_KU | 0007 | 99999999 | NA | 20090930 | NA | 20 | NA | 2000 | | | No | | | |
| S_SDS | 0023 | 2 | ITSH_UB | 0000 | 20090331 | | | | | | | | | | | | |
| S_SDS | 0023 | 2 | ITSH_UB | 0000 | 20090430 | | | | | | | | | | | | |
| S_SDS | 0023 | 2 | ITSH_UB | 0000 | 20090531 | | | | | | | | | | | | |
| S_SDS | 0023 | 2 | ITSH_UB | 0000 | 20090630 | | | | | | | | | | | | |
| S_SDS | 0023 | 2 | ITSH_UB | 0000 | 20090731 | | | | | | | | | | | | |

FIG. 11A

■ (T9) Target development program information table

| Consignor ID | Receipt No | Program ID | Program name | C/S type | Program Grade | Spec. Exists? | Required completion date | Developer ID | Development Completion Date | Business Responsible Person ID | Test Completion Date | Approved? | Approved Date | Development Delay Reason | Test Delay Reason |
|---|---|---|---|---|---|---|---|---|---|---|---|---|---|---|---|
| S_SDS | 0023 | Aaa_12_rt001 | Query reference value | K01 | A | Yes | 20090531 | Dku002 | 20090430 | SDS002 | 20090502 | Ok | 20090503 | | |
| S_SDS | 0023 | Aaa_12_rt011 | Query balance | K01 | B | Yes | 20090631 | | | | | No | | L01 | M01 |
| S_SDS | 0023 | Aaa_12_rt012 | Input item | K01 | B | Yes | 20090515 | | | | | No | | L02 | M02 |
| S_SDS | 0023 | Aaa_12_ss001 | Concluded reference value balance | K01 | C | Yes | 20090430 | | | | | No | | L01 | M01 |
| S_SDS | 0023 | Aaa_12_rt049 | Query trade details | K01 | A | No | 20090531 | | | | 20090527 | Ok | 20090527 | | |

FIG. 11B

■ (T10) Consignment and development pool manager/developer information table

| Consignor ID | Receipt No | Manager and Developer ID | Password | Name | Start Date used | Expiration Date used | Last IP | Classification code | e-mail Address | Recent Login Date |
|---|---|---|---|---|---|---|---|---|---|---|
| S_SDS | 0823 | SDS000 | ******** | Lee Cheol-jae | 20090227 | 20090812 | 189.21.23.21 | N01 | cjlee@samsu | 200903011223 |
| S_SDS | 0823 | SDS001 | ******** | Kim Gae-dong | 20090227 | 20090812 | 189.21.23.22 | N02 | | |
| S_SDS | 0823 | SDS002 | ******** | Han Deoksu | 20090227 | 20090812 | 189.21.23.23 | N02 | | |
| S_SDS | 0823 | Dku800 | ******** | Kim Yeong-an | 20090227 | 20090812 | 201.23.23.20 | N11 | | |
| S_SDS | 0823 | Dku801 | ******** | Kim Eul-dong | 20090227 | 20090812 | 201.23.23.21 | N12 | | |
| S_SDS | 0823 | Dku802 | ******** | Park Yeong-cheol | 20090227 | 20090812 | 201.23.23.22 | N12 | | |
| S_SDS | 0823 | Dku803 | ******** | Han Sang-pil | 20090227 | 20090812 | 201.23.23.23 | N12 | | |
| S_SDS | 0823 | Dku804 | ******** | Lee Ji-yeong | 20090227 | 20090812 | 201.23.23.24 | N12 | | |
| S_SDS | 0823 | Dku805 | ******** | You Han-seok | 20090227 | 20090812 | 201.23.23.25 | N12 | | |

FIG. 11C

■ (T11) Development progress information summary table (results until yesterday)

| Consignor ID | Receipt No | S Development Plan | S Development Results | S Test Results | C Development Plan | C Development Results | C Test Results | S Development Plan | S Development Results | S Test Results | C Development Plan | C Development Results | C Test Results |
|---|---|---|---|---|---|---|---|---|---|---|---|---|---|
| | | <All> | | | | | | <Up to today> | | | | | |
| S_SDS | 0023 | 1000 | 700 | 650 | 200 | 140 | 120 | 400 | 380 | 360 | 80 | 90 | 76 |
| S_SKCNC | 0118 | | | | | | | | | | | | |
| S_LGCNS | 0029 | | | | | | | | | | | | |
| S_HIT | 0014 | | | | | | | | | | | | |
| S_POSDATA | 0012 | | | | | | | | | | | | |

Fig. 12

(T12) Development progress bulletin board information table

| Consignor ID | Receipt No | Receipt Date | Receipt Time | Receipt Type | Recipient ID | Title | DATA Type | Attachment | Attachment Path |
|---|---|---|---|---|---|---|---|---|---|
| S_SDS | 0023 | 20090301 | 102321 | 001 | SDS000 | Inform development framework education | P01 | Yes | S_SDS0023> |
| S_SDS | 0023 | 20090312 | 191231 | 002 | DKU000 | All developers gather at lecture room 1 until 10:00 | P01 | No | |
| S_SDS | 0023 | 20090313 | 123123 | 001 | SDS000 | Development Spec. Please refer to it. | P02 | Yes | |
| S_SDS | 0023 | 20090320 | 143212 | 001 | SDS001 | | P03 | No | |
| S_SDS | 0023 | 20090401 | 201821 | 002 | DKU005 | | P04 | No | |

(T13) Various code information table

| Classification Code | Code Number | Code Contents | Date of generation | Whether it is used or not | Related table |
|---|---|---|---|---|---|
| A | 00 | Business corporate code | 20090301 | | T1, T2 |
| B | 00 | Location code (area code) | 20090301 | | T2, T4 |
| C | 00 | Trust evaluation problem code | 20090301 | | T3 |
| D | 00 | Contracted amount payment condition code | 20090301 | | T4, T7 |
| E | 00 | Penalty condition code when violating contract | 20090301 | | T4, T7 |
| F | 00 | Development consignment rejection reason code | 20090301 | | T4 |
| G | 00 | Development consignment receipt and approval status code | 20090301 | | T4 |
| H | 00 | Development trust rejection reason code | 20090301 | | T6 |
| I | 00 | Development trust rejection reason code | 20090301 | | T6 |
| J | 00 | Payment supply arrears reason code | 20090301 | | T8 |
| K | 00 | Development part target classification code (S: Server, C: Client) | 20090301 | | T9 |
| L | 00 | Development delay reason code | 20090301 | | T9 |
| M | 00 | Test delay reason code | 20090301 | | T9 |
| N | 00 | Consignment/trust manager/developer classification code | 20090301 | | T10 |
| O | 00 | Issue registration and receipt classification code upon development | 20090301 | | T12 |
| P | 00 | Attachment type classification code | 20090301 | | T12 |
| | | | 20090301 | | |
| Z | 00 | Contract number | 20090301 | | T7 |
| Z | 2009 | 0429 | 20090301 | | T7 |

Fig. 18

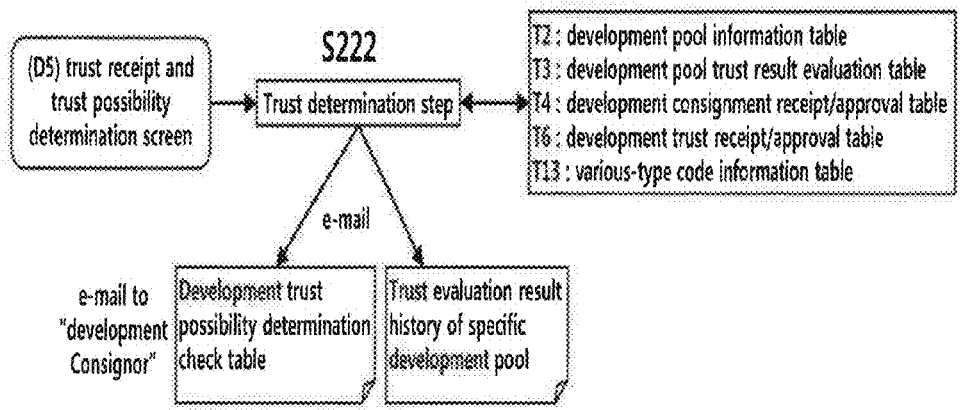

< Development trust possibility determination check table >

| Development Pool | (T6) development trust receipt/approval table ||||||| (T2) development pool information table ||||||| (T3) development pool trust result evaluation table (recent) ||| Evaluation result number |
|---|---|---|---|---|---|---|---|---|---|---|---|---|---|---|---|---|---|
| | Estimated amount | Payment condition accepted? | Penalty accepted? | Available manpower | Trust experience | Deadline Schedule | Credit Grade | Trust Number | Rejection Number | Included Developers | Number of Problems | Trust Request Grade | Development Pool Location | Evaluation results | Evaluation summary contents | Number of Problems | |
| A company | 180,000 | yes | yes | 80 | 5 | 20090731 | A+ | 5 | 2 | 240 | 2 | B+ | Kangnam | B | ......... | C01 | 3 |
| B company | 175,000 | yes | yes | 160 | 8 | 20090731 | A+ | 8 | 4 | 480 | 2 | B+ | Kangnam | B+ | | | 2 |
| C company | 180,000 | yes | yes | 160 | 17 | 20090731 | A+ | 17 | 12 | 640 | 1 | B+ | Yeoido | C | | C03 | 5 |
| D company | 180,000 | yes | yes | 10 | 2 | 20090731 | A | 2 | 1 | 75 | 1 | A | Seodamun | B | | | 4 |
| E company | 177,000 | yes | yes | 120 | 39 | 20090731 | A | 39 | 9 | 430 | 0 | A+ | Bundang | A | | NA | 1 |

REMOTE PROGRAM DEVELOPMENT MEDIATION SYSTEM AND METHOD FOR MEDIATING A PROGRAM DEVELOPMENT CONTRACT AND DEVELOPMENT OF PROGRAM USING VIRTUAL DEVELOPMENT ENVIRONMENT OF CLIENT

CROSS-REFERENCE TO RELATED APPLICATION

This U.S. non-provisional patent application is a Continuation Application of PCT International Application No. PCT/KR2011/000995 (filed on Feb. 16, 2011), which claims priority under 35 U.S.C. §119 of Korean Patent Application Nos. 10-2010-0016304 (filed on Feb. 23, 2010) and 10-2011-0005079 (filed on Jan. 18, 2011), which are all hereby incorporated by reference in their entirety.

BACKGROUND OF THE INVENTION

1. Field of the Invention

The present invention relates to a remote program development mediation system and method for enabling remote program development by mediating a program development contract between a development consignor and a developer, constructing the development environment of a developer terminal for developing a program in a Client/Server (C/S) environment in a virtualization server, and allowing a virtualization server to provide the developer terminal with a development tool image of a virtualized development framework.

2. Background of the Related Art

FIGS. 1 and 2 are conceptual diagrams of a conventional program development system.

Referring to FIG. 1, in modern society, most of business enterprises including public institutions construct and utilize information systems in operating their enterprises, but the business operations have reached the state in which the enterprises may be no longer operated without operating the information systems. Corporate customers who want to construct information systems and SI business enterprises which want to perform projects for constructing the systems secure developers for most parts of target development programs calculated through business analysis and design through specialized collaboration companies which provide development manpower. The secured developers reside in the corporate customers and the SI business enterprises and develop the programs.

In this development environment, corporate customer and SI business enterprises have the following problems A) to F).

A) As lots of projects are performed almost at the same time depending on the type of business, it is difficult to secure optimal developers based on necessary time owing to limited development manpower.

B) It is very difficult to determine whether secure manpower is suitable for development or not.

C) A problem arises in the entire project schedule because outside order developers quit their jobs even during development if they receive higher payments from other projects.

D) It is difficult to call poor specialized collaboration companies to task for their responsibility when a freelancer causes a problem because the companies hire lost of freelancers.

E) It is very difficult to prevent the leakage of know-how because outside developers move development know-how to other projects after development.

F) It is also inefficient to calculate development costs because the development costs are calculated based on the grade of a developer not based on the degree of difficulty of a program.

Furthermore, specialized business enterprises which provide development manpower and freelancers have the following problems i) to iii).

i) It is difficult to know what customer and what SI project require manpower because corporate customers and SI business enterprises do their businesses through individual visits through limited human network in order to provide their manpower.

ii) Although their manpower is inverted in projects, various problems arise because the manpower quit the projects if they receive a slightly high payment from other project.

iii) If their manpower waits for two months only without investing them in projects, monthly salaries must be paid. Accordingly, a fatal business problem occurs in specialized collaboration companies.

Referring to FIG. 2, a reason why a corporate customer and an SI business enterprise have developers reside in their projects for development is that outside development manpower may be directly managed and the security of development information may be maintained. There is a difficulty in that not only the development business of development manpower, but also overall business occurring to resident manpower must be managed. Furthermore, attention must be paid to the security management of development information because a project development business is performed in a developer PC.

SUMMARY OF THE INVENTION

Accordingly, the present invention has been made in view of the above problems occurring in the prior art, and it is an object of the present invention to request remote developers to develop a program by paying costs according to the grade of a development program by not using a method of securing developers in exchange for costs according to the grade of a developer and have the secured developers reside in a project.

It is another object of the present invention to remove the mistrust of a consignor regarding program quality and the deadline according to remote development, observe development standards although developers perform remote development, provide an environment in which development can be performed efficiently and rapidly, solve various types of security problems according to remote development on the consignor side, and enable remote development.

It is yet another object of the present invention to provide a remote program development mediation system and method which enable developers to develop programs by mediating a program development consignment contract between a program consignor and a developer, constructing the development environment of a developer terminal in a virtualization server when a contract is concluded, and allowing the virtualization server to provide the developer terminal with a development tool image of a virtualized development framework.

In an aspect, the present invention provides a remote program development mediation system for mediating a program development contract between a consignor and a developer using wired and wireless networks and providing a developer terminal with a virtual development function of a program. The remote program development mediation system includes a development hub portal server configured to provide a homepage, register a consignment request of the consignor and trust requests of development pools, mediate a program development contract and cost payment between the consignor and a selected development pool, provide information about a program development progress performed by the development pool, and perform development execution evaluation processing of the development pool, and perform login access of the developer terminal; a virtual development platform server configured to provide the remote service of the development framework, edit and store a source program received from the developer terminal, request the consignor server to generate an execution program and test the execution program by sending a source program to the consignor server, provide processing results to the developer terminal, and perform the virtual development function of the developer terminal; a hub manager terminal configured to mediate the contract by approving the consignment request of the consignor and the trust request of the development pool through the development hub portal server and set a remote service environment of the development framework in the virtual development platform server based on information about program development, the development framework of the consignor, and the client virtualization solution; a consignor server configured to provide the development framework of the consignor to the virtual development platform server, receive the source program from the virtual development platform server at the request of the developer terminal, generate the execution program based on the received source program, and perform a test and provide results at the request of a consignor terminal and the developer terminal that has accessed the virtual development platform server; the consignor terminal configured to request the consignment from the development hub portal server, receive information about an approved developer pool from a hub manager, select a trust target based on the received information, monitor the development progress process of a developer in real time, access the consignor server, perform a test for the program in real time, and registers results of th test with the development hub portal server; and a developer terminal configured to search the development hub portal server for approved consignment information, request trust based on the retrieved approved consignment information, receive remote service and virtual development function of the development framework from the virtual development platform server, remotely develop and test a program using only a screen input and output function, and register results of the development with the development hub portal server.

In the present invention, the development hub portal server includes a consignment request module for receiving information about the consignor, development consignment information, information about the development environment from the consignor terminal and storing the received information in a DB; a consignment determination module for providing information about consignment of the consignor to the hub manager terminal, registering consignment receipt received from the hub manager terminal, providing the hub manager terminal with consignment possibility information obtained by analyzing the information about the development environment of the consignor, registering information about whether the consignment has been approved or not which has been received from the hub manager terminal, and storing the information in the DB; and a consignment notice module for informing the consignor terminal of information about whether the hub manager has approved the consignment or not and informing the information about the consignment of the consignor through a bulletin board if the hub manager has approved the consignment.

Here, the development hub portal server includes a trust request module for receiving information about the development pool and a trust request of a noticed consignment program development from the developer terminal and storing the received information in the DB; a trust determination module for providing information about the trust of the development pool to the hub manager terminal, registering trust receipt contents received from the hub manager terminal, evaluating information about development histories of the development pools which have requested trust for a consignment request case, generating development evaluation information having grade, informing the consignor terminal of the generated development evaluation information, receiving trust-determined development information selected by the consignor terminal, and storing the received trust-determined development information in the DB; a trust determination approval module for sending information about the trust-determined development pool to the hub manager terminal, registering information about whether the determination has been approved or not, and providing approval information and a reason to the developer terminal; a contract mediation module for storing the contract information between the consignor and the developer in the DB, storing a development cost payment schedule and amount, generated according to a payment condition of the contract information, in the DB, generating a contract draft, providing the generated contract draft to the consignor terminal and the developer terminal, registering an amendment to the contract and additional contents received from the consignor terminal and the developer terminal, storing the amendment and the additional contents in the DB, generating a concluded final contract and relevant files in a form of an image file, and storing the image file in the DB; a program and manager registration module for registering specifications for each program, information about the development schedule, and information about a manager for the contract concluded program which have been received from the consignor terminal and storing the specifications, the information about the development schedule, and the information about the manager in the DB; and a developer registration module for registering information about developers belonging to a development pool which has been received from the developer terminal and storing the information about the developers in the DB.

Furthermore, the development hub portal server includes a present development condition registration module for registering development completion information for each program which has been received from the developer terminal and storing the development completion information in the DB; a present development condition query module for receiving a request to search for a present development progress condition from the consignor, the hub manager, the development pool manager, and the developer and providing information about the present development condition; a development completion approval module for providing the consignor terminal with information about whether each developed program has been tested or not, accessing the consignor server, registering information about whether a test has been performed or not, whether development completion has been approved or not, and a reason which have been received from the consignor terminal that has performed the test, and storing the received information in the DB; and a development progress bulletin board module for registering notices occurring in a program development project and problems upon development which have been received from the consignor, the hub manager, the development pool manager, and the developer and providing search service.

Furthermore, the development hub portal server includes a development cost demand module for receiving a cost payment request from the developer terminal and informing the consignor terminal of development cost demand details including a development plan versus result information; a development cost payment module for providing information about the development plan versus result and information about development costs at the request of the consignor terminal that has received the development cost demand details, registering information about payment results or arrears received from the consignor terminal, storing the received information in the DB; and a development result evaluation module for automatically calculating grades of all programs and grades of projects based on information about whether a deadline of each developed program has been observed or not and elapsed days by applying weight to all the programs and projects, providing results of the calculation to the consignor terminal, receiving comprehensive evaluation details of the consignor, and storing a project execution evaluation grade of each development pool in the DB.

In another aspect, the present invention provides a remote program development mediation system in which a virtual development platform server provides a developer terminal with remote service of a development framework and develops a program for a consignor server in a virtual development environment. The virtual development platform server includes a platform configuration module configured to set a remote service environment of the development framework by installing virtualization software for controlling a plurality of OSs in order to provide an independent development environment to each developer of a development pool according to setting of a manager of the virtual development platform server, installing a virtual machine for each developer on the installed virtualization software, installing a client OS in each virtual machine, installing an application development framework, environment files, and consignor server access information, received from a consignor server, on the OS, and providing the developer terminal with communication software installed in the developer terminal and then to set a virtual development function for developing a program remotely by providing a development tool image to the developer terminal, a development framework editing and storing a source program in response to a command received through the development tool image displayed in the developer terminal by providing the development terminal with the development tool image, sending the source program to the consignor server through a dedicated line, requesting the consignor server to generate an execution program and to test the execution program, receiving processing results from the consignor server, and providing the processing results to the developer terminal; and a development progress module configuring to approve a login request of the developer terminal, assign a designated virtual machine to each developer, and perform a virtual development function performed by the development framework of the designated virtual machine according to a request of the developer terminal to develop and test a program.

In the present invention, the virtual development platform server includes virtualization software directly installed in hardware and configured to control a plurality of OSs; a virtual machine controlled by the virtualization software over the hardware and configured to form a development environment specific to a developer within an operated guest OS; management software configured to provide session management, a distribution function, and a snapshot function to the virtual machine and monitor and manage the virtual machine; and a client virtualization solution associated with code software for providing the developer terminal with a development tool image of the development framework mounted on the virtual machine with high picture quality, wherein communication software which is an element of a client virtualization solution that enables access to the development framework that is mounted on the virtual machine of the virtual development platform server is installed in the developer terminal.

Here, an application development framework is installed and executed in the virtual development platform server, and an application development framework associates and integrates a development tool for integrally providing a development-dedicated editor that enables a program to be completed when developers forcibly observe development standards defined by a consignor and develop only business logic, standard programs, standard input and output packets, common system modules, common business modules, compilers, and builders and debuggers; and a test tool for managing development quality by writing test data, supporting a test, performing an actual test, and checking program codes so that a consignor and developers can perform a test for a program in real time.

Meanwhile, in yet another aspect, the present invention provides a remote program development mediation method of mediating a program development contract between a consignor and a developer using wired and wireless networks and providing a developer terminal with a virtual development function of a program. The remote program development mediation method includes the steps of (S21) a development hub portal server registering information about the consignor and a program development consignment request received from a consignor terminal which has accessed a homepage and informing a developer terminal of consignment information when an examination regarding that remote service of a development framework for the registered consignment information is possible is received from a hub manager terminal; (S22) the development hub portal server registering a trust request received from the developer terminal, providing the consignor terminal with information about development evaluation histories of each development pool that has requested trust, registering information about a trust-determined development pool which has received from the consignor terminal, informing the developer terminal of the registered information, and mediating a contract between a consignor and a developer; (S23) when the contract is concluded, a virtual development platform server installing virtualization software for controlling a plurality of OSs in order to provide an independent development environment to each developer of a development pool according to setting of a hub manager, installing a virtual machine for each developer over the installed virtualization software, installing a client OS in each virtual machine, installing an application development framework, environment files, and consignor server access information, received from the consignor server, over the OS, providing the developer terminal with communication software installed in the developer terminal, setting a remote service environment of the development framework, and setting a virtual development function; (S24) the virtual development platform server developing and testing a program remotely by performing a virtual development function of the developer terminal by editing and storing a source program, coded by a developer, sending the source program to the consignor server, requesting the consignor server to generate and test an execution program, and providing processing results to the developer terminal in a process of providing the remote service of the development framework to a logged developer terminal; (S25) the development hub portal server registering development completion information received from the developer terminal, providing the consignor terminal and the developer terminal with information about the development progress of the program, and registering information about whether development completion has been approved which has been received from the consignor terminal that has accessed the consignor server and performed each program test; and (S26) the development hub portal server mediating a cost payment for a developed program between the consignor and the developer, generating development execution evaluation information about a development pool, providing the development execution evaluation information to the consignor terminal, receiving comprehensive evaluation details of the consignor, and registering a project execution evaluation grade of the development pool.

BRIEF DESCRIPTION OF THE DRAWINGS

The following drawings attached to this specification illustrate exemplary embodiments of the present invention and function to further make understood the technical spirit of the present invention along with the detailed description of the present invention to be described later, and the present invention should not be interpreted as being limited to the description of the drawings only.

FIGS. 7 to 12 show the structures of the DB of the development hub portal server and the virtual development platform server in accordance with an embodiment of the present invention.

FIGS. 14 to 32 show functions diagrams of individual steps shown in FIG. 13.

DETAILED DESCRIPTION OF EMBODIMENTS

Some exemplary embodiments of the present invention will now be described in detail with reference to the accompanying drawings.

<1. System Configuration>

Figure 3:
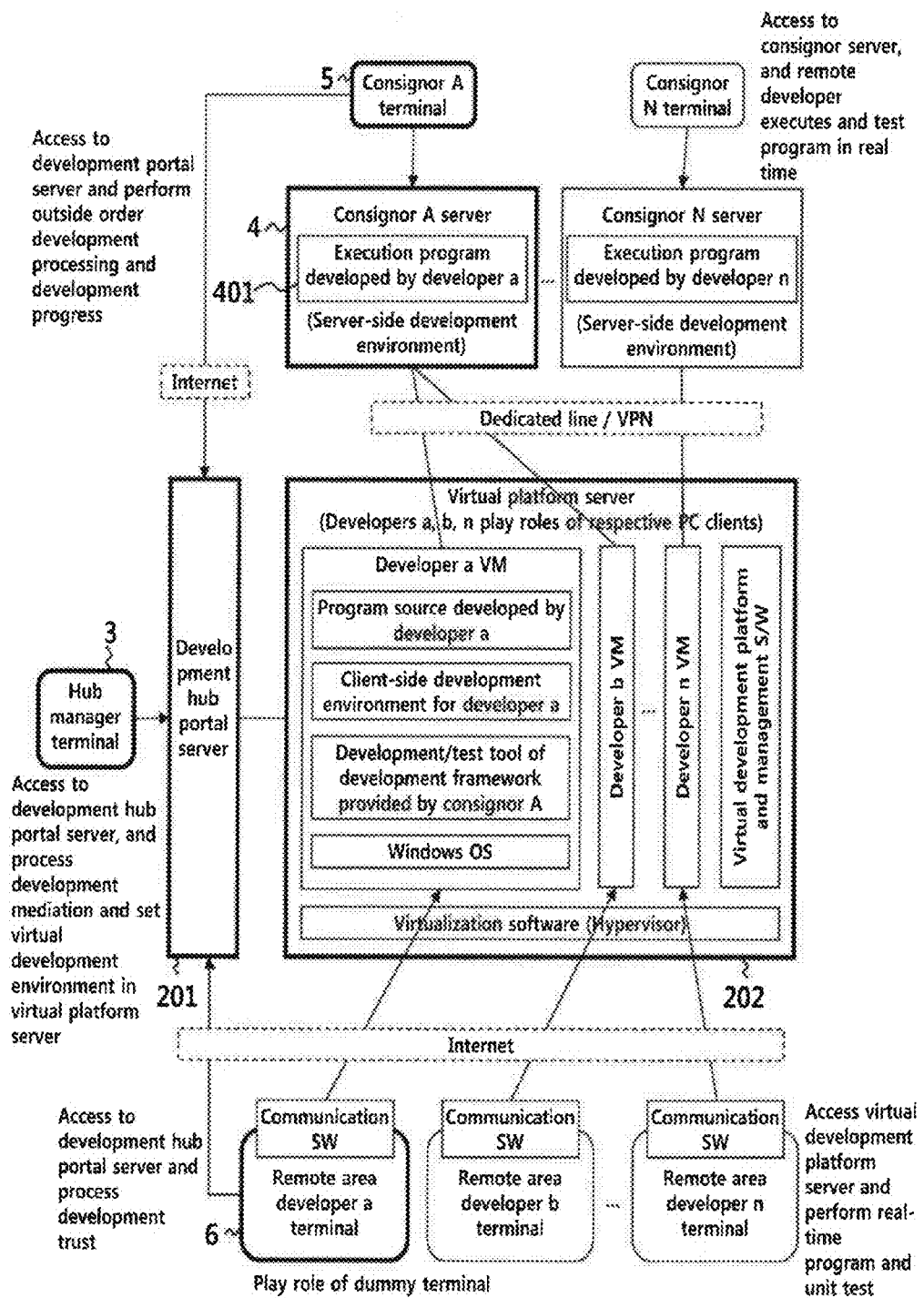
FIG. 3 to 5 show schematic constructions of a development hub portal server and a virtual development platform server in accordance with an embodiment of the present invention.
Figure 4:
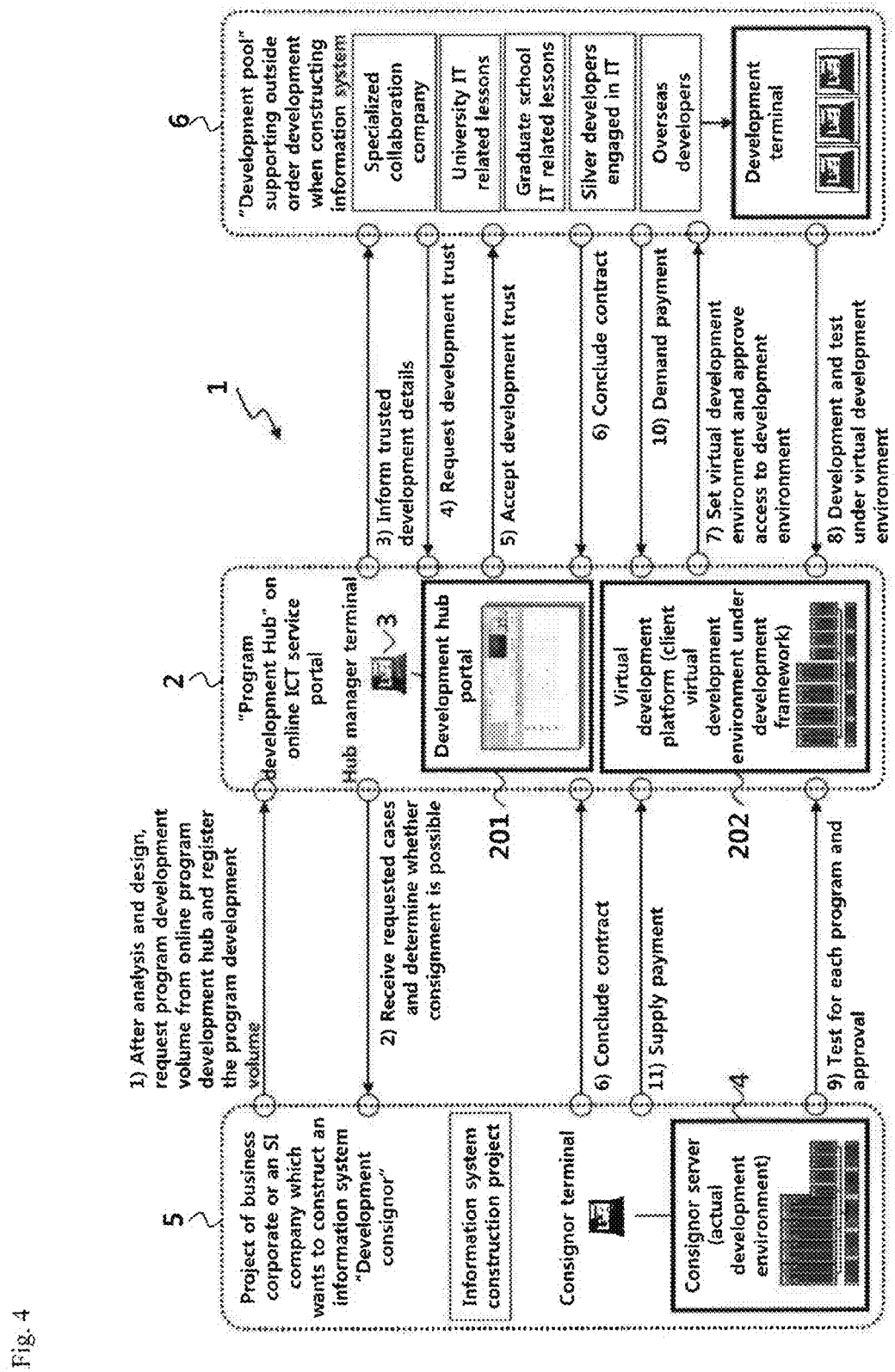

FIGS. 3 and 4 show schematic constructions of a remote program development mediation system 1 in accordance with an embodiment of the present invention.

The remote program development mediation system 1 in accordance with an embodiment of the present invention includes a development hub portal server 201, a virtual development platform server 202, a hub manager terminal 3, a consignor server 4, a consignor terminal 5, and a developer terminal 6 which exchange data through communication over wired and wireless networks.

The wired and wireless networks in the present invention include wired and wireless public networks, such as a mobile communication network and the Internet, or all communication networks over which data can be communicated by using various protocols, such as a dedicated network.

First, the development hub portal server 201 provides a homepage and mediates a program development contract between a consignor and a developer. The homepage corresponds to a portal homepage which provides online Information Communication Technology (ICT) service. Furthermore, after a contract is concluded, the development hub portal server 201 provides the consignor terminal 5 and the developer terminal 6 with information about development progress and information about development cost settlement and development quality evaluation. Next, the virtual development platform server 202 receives a development framework (e.g., a development tool and a development environment) necessary for development from the consignor server 4 and virtually constructs a development environment that will be used by the developer terminal 6. Furthermore, the virtual development platform server 202 provides a development tool image of the virtualized development framework to the developer terminal 6 which has accessed to and logged through the development hub portal server 201 in order to support the program development of the developer terminal 6. Here, what the virtual development platform server 202 provides the development tool image means that the virtual development platform server 202 provides remote service for the development framework, including the development tool and the development environment, so that a developer can develop a program. That is, a developer can remotely access the virtual development platform server 202 through the developer terminal 6 and develop a program by using only an Internet communication function, an input function, and a screen output function. Here, it is preferred that the development hub portal server 201 and the virtual development platform server 202 be constructed into two different distribution servers as show in FIG. 3.

The hub manager terminal 3 mediates a program development contract by accessing the homepage of the development hub portal server 201, approving the consignment request of a registered consignor for program development, and approving the trust request of a developer. Here, the hub manager determines whether development consigned cases for the development hub portal server 201 can be trusted for a plurality of trust-requested request cases and provides information on which the consignor can select optimal developers. A criterion for trustable determination includes information about the past trust result evaluation histories of developers who have accepted the requests. Accordingly, the consignor can receive a trustable determination check table including a plurality of candidate developers and select target trust developers from the table.

When a program development contract is concluded between the consignor and the developers, the hub manager terminal 3 constructs a development environment that will be used by the developer terminal 6 in order to develop the concluded program by using a development framework and a client virtualization solution.

Here, the client virtualization solution is that the developer terminal 6 uses the virtual development platform server 202 as its virtual client. A client is divided into the developer terminal 6 and the virtual development platform server 202 through the client virtualization solution. Furthermore, the developer terminal 6 has the screen input and output functions of the client, and the virtual development platform server 202 has the data storage and processing functions of the client.

That is, when the hub manager constructs the program development environment in the virtual development platform server 202, the developers can access the virtual development platform server 202 and develop the concluded program.

The consignor server 4 is a server in which a program 401 consigned and concluded in the development hub portal server 201 is developed and executed. A program developed by the developer terminal 6 in the virtual development platform server 202 is completed into the execution program 401 in the consignor server 4. Preferably, if the consignor server 4 and the virtual development platform server 202 are interconnected over a dedicated network, a further secured program environment can be constructed.

The consignor terminal 5 access the development hub portal server 201 and requests consignment by inputting consignor information, development program information (e.g., program specifications), development environment information (e.g., a development tool), and contract information (e.g., schedule information and cost information). Furthermore, the consignor terminal 5 receives information about developers recommended by the hub manager terminal 3 and selects target trust developers from the recommended developers. Furthermore, the consignor terminal 5 controls and monitors the program development of the selected developers through the development hub portal server 201 and tests intermediate program results in the consignor server 4. When the program test is completed, the consignor terminal 5 registers development completion approval, evaluates the quality of the program, pays predetermined costs, and registers them with the development hub portal server 201.

The developer terminal 6 is a personal or enterprise terminal configured to search for information about development requests of consignors who have be registered with the development hub portal server 201, register development pool information including one or more developers, and request consignment. After the developer terminal 6 searches for information about the development project of a specific program, requests trust, and receives the selection of a consignee from the consignor terminal 5 through the development hub portal server 201, and a contract is concluded, the developers input their pieces of information, forming a development pool, for each program. Furthermore, when access to the virtual development platform server 202 is approved by the hub manager terminal 3, the developer terminal 6 accesses the virtual development platform server 202 and performs program development remotely. Furthermore, the developer terminal 6 registers program development completion information with the development hub portal server 201 and demands development costs for the completed program.

Figure 5:
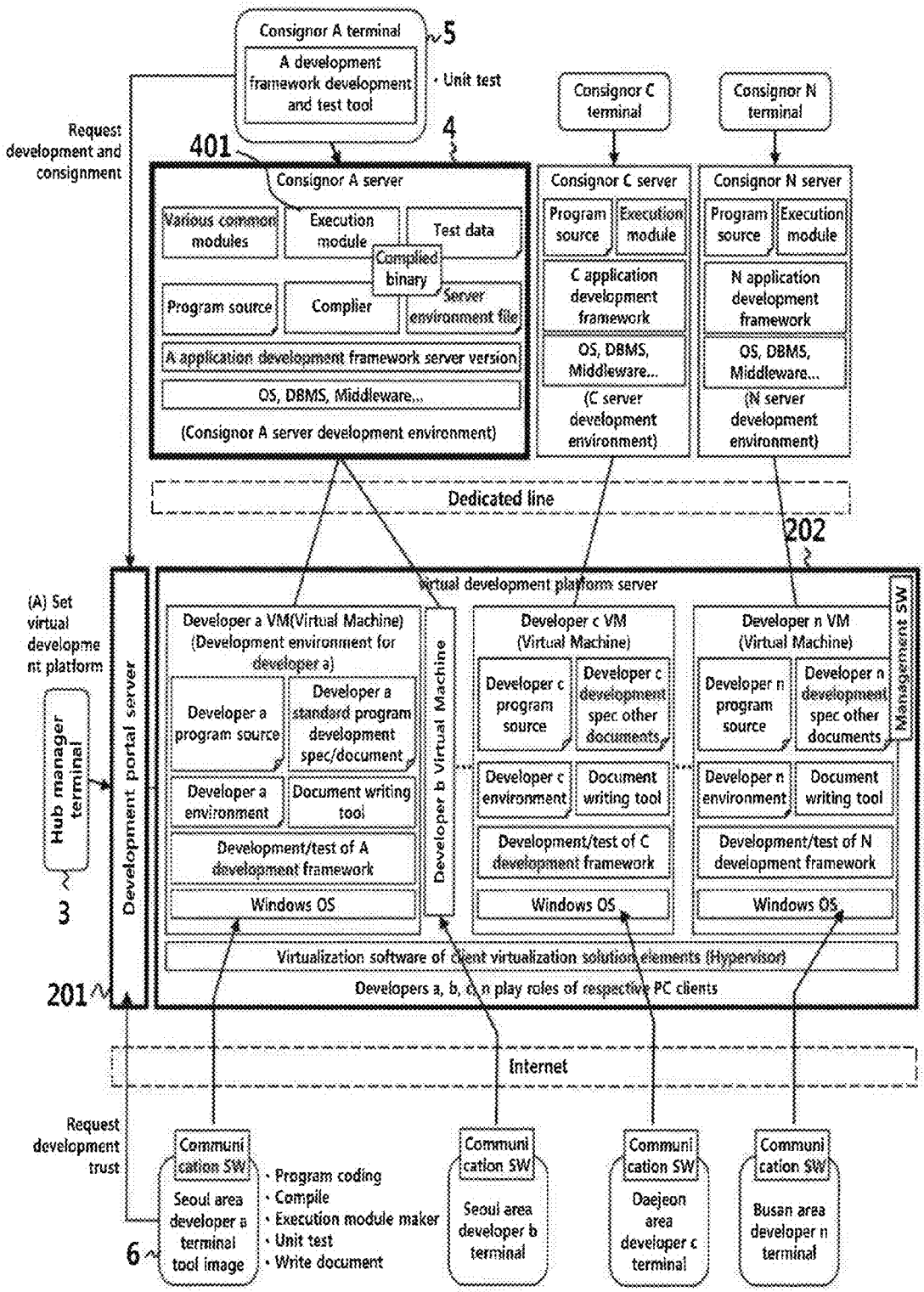

FIG. 5 shows the configuration of the virtual development environment of the remote program development mediation system 1 in accordance with an embodiment of the present invention.

The development hub portal server 201 is the portal site of a "program development hub" equipped with a database server, an application server, and a web server configured to provide input, query, and manage various types of pieces of information that are necessary in development consignment, development trust, and development processes between a consignor, the hub manager, and developer by providing the homepage.

Furthermore, the virtual development platform server 202 provides a virtual development environment to which a representative development framework-based client virtualization solution for actual and remote development has been applied to the developer terminals 6 which have accessed thereto through the development hub portal server 201. A development consignor is equipped with the consignor server 4 in which the consignment-developed program 401 is executed, and a development pool is equipped with the developer terminals 6 for remote development.

A conventional development environment includes the two layers of a server and a client. The server is responsible for a function of executing (compilation & link) and executing a source program developed in the client. Furthermore, the client has a function of inputting and editing a program source through a development tool and development environment provided by a development framework (the installation of the client), outputting the results of the input and edition to a screen, and locally storing the program source.

In contrast, the virtual development environment provided by the present invention includes three layers including a server, a virtualization server, and a development PC. In the present invention, the "server" corresponds to the consignor server 2, the "virtualization server" corresponds to the virtual development platform server 202, and the "development PC" corresponds to the developer terminal 6.

In the present invention, the processing function of a conventional client is constructed in and processed by the virtual development platform server 202 by applying the client virtualization solution. That is, in the present invention, the virtual development platform server 202 performs the functions of the conventional client, and the developer terminal 6 performs only a dummy terminal function of simply outputting and inputting a program source through an image of the development tool provided by the virtual development platform server 202.

Accordingly, a development framework, including a development tool and a development environment for development, is downloaded from the consignor server 4 and installed in the virtual development platform server 202. Furthermore, the virtual development platform server 202 performs a function of editing a program source received through the developer terminal 6 and stores relevant files including a source. Furthermore, the virtual development platform server 202 sends the stored program source to the consignor server 4 and generates the program source as an executable program module through compilation & link. For this reason, information about the consignor is maintained because the developer terminal 6 does not download the program source and the relevant files.

Figure 6:
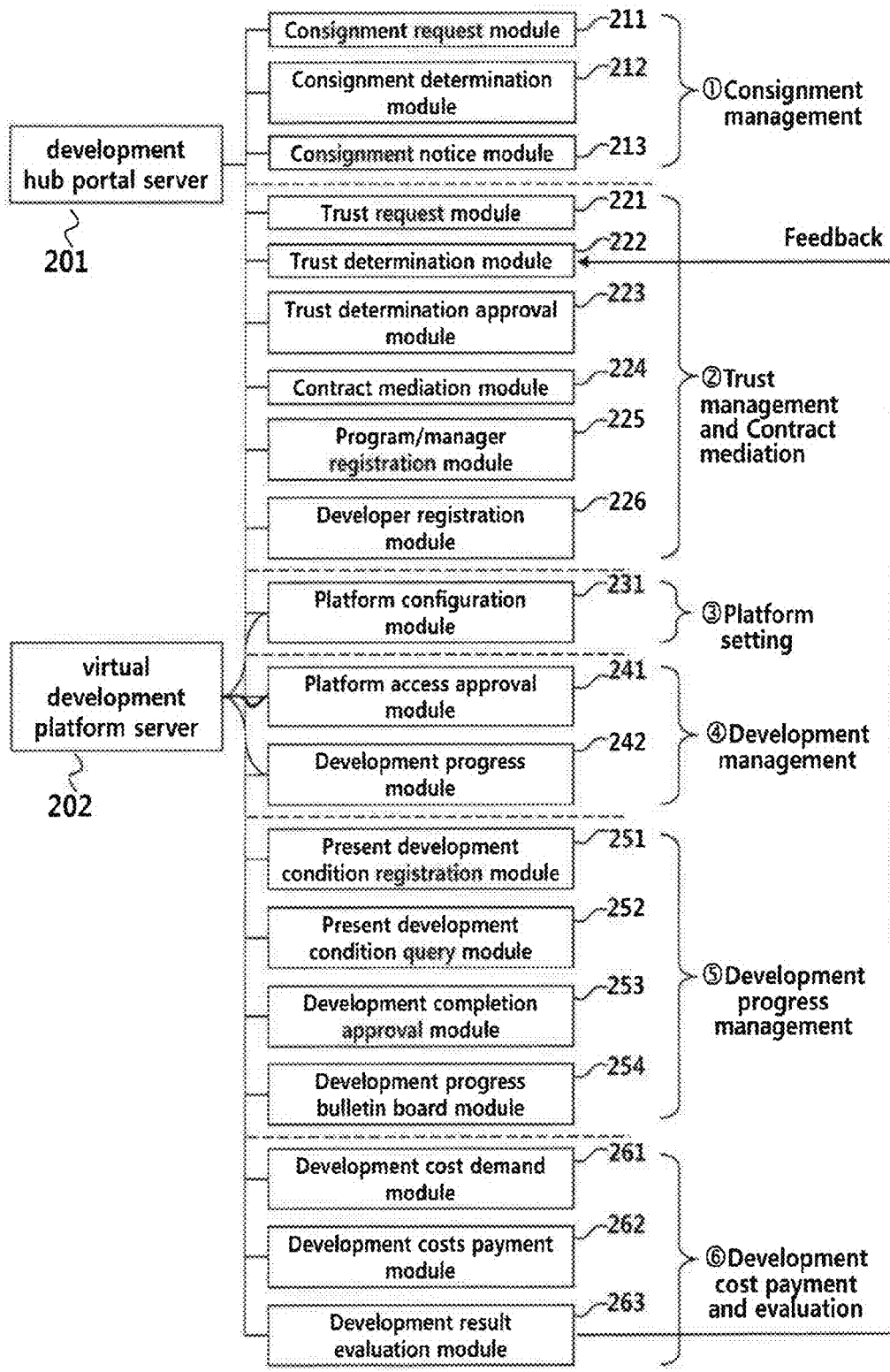
FIG. 6 shows a schematic internal structure of the development hub portal server and the virtual development platform server in accordance with an embodiment of the present invention.

FIG. 6 shows a schematic internal structure of the development hub portal server 201 and the virtual development platform server 202 in accordance with an embodiment of the present invention.

Modules that form the development hub portal server 201 and the virtual development platform server 202 may be classified into ① consignment management, ② trust management & contract mediation, ③ platform configuration, ④ development management, ⑤ development progress management, and ⑥ development cost settlement & evaluation.

First, ① The module that forms consignment management includes a consignment request module 211 configured to receive and register the consignment request of a consignor through a homepage, a consignment determination module 212 configured to receive the approval of the consignment request of a consignor from the hub manager, and a consignment notice module 213 configured to provide approved consignment information to developers by posting the consignment information on a homepage.

② The module that forms trust management & contract mediation includes a trust request module 221 configured to register the trust request of a consignee for a program development consignment case that has been requested by a consignor through a homepage, a trust determination module 222 configured to grade the priority of developers for which trust has been requested by the hub manager, provide the graded priorities to a consignor, and receive a consignee finally selected by the consignor, a trust determination approval module 223 configured to have the hub manager to approve developers selected by a consignor and inform the developers from the approval, a contract mediation module 224 configured to mediate a contract between a consignor and developers and registers contract conclusion information, a program/manager registration module 225 configured to register program specifications, development schedule information, and responsible person information for each program which have been received from a consignor, and a developer registration module 226 configured to register information about developers who will be invested in development business from the manager of a development pool.

③ The module that forms platform configuration includes a platform configuration module 231 which enables the hub manager to construct a development environment to be used by the developer terminal 6 in the virtual development platform server 202 based on the development framework and the client virtualization solution with reference to information about the consignment of a consignor when a program is developed.

④ The module that forms development management includes a platform access approval module 241 configured to approve access to the virtual development platform server 202 at the request of a developer belonging to a development pool and a development progress module 242 configured to edit and store a program source, received from the developer terminal 6, in the virtual development platform server 202, execute and test the program source in the consignor server 6, and develop a program remotely.

⑤ The module that forms development progress management includes a present development condition registration module 251 configured to register a development progress and development completion for each program which has been received from a developer, a present development condition query module 252 configured to provide the present development condition information to a consignor, the hub manager, and developers, a development completion approval module 253 configured to provide the test service of a program to a consignor and receives information about whether development completion has been approved, and a development progress bulletin board module 254 configured to provide relevant development parties with the registration and query services of notices and problems of a program.

⑥ The module that forms development cost settlement & evaluation includes a development cost demand module 261 configured to receive a payment request from a developer and inform a consignor from a development cost demand, a development costs payment module 262 configured to provides a consignor with development cost details and registers payment results and a development result evaluation module 263 configured to calculate all program grades and all project grades by applying weight to all the program grades and all the project grades based on a development program and provide the calculated grades to a consignor, receive the comprehensive evaluation details from the consignor, and register the project execution evaluation grade of a development pool.

FIGS. 7 to 12 show DB structure of data constructed in the development hub portal server 201 and the virtual development platform server 202 in accordance with an embodiment of the present invention.

The individual modules of FIG. 6 and the DB structure of FIGS. 7 and 12 are described below in connection with a remote program development mediation method.

<2. Method Construction>

In accordance with an embodiment of the present invention, a remote program development mediation method of mediating a program development contract and program development using the virtual development environment of a client may be preferably embodied by constructing the above-described remote program development mediation system 1.

Figure 13:
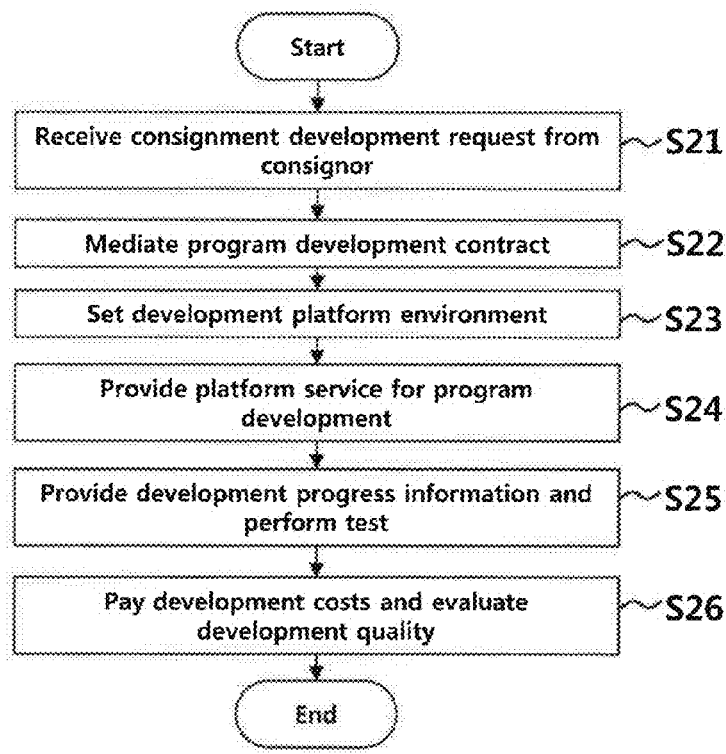
FIG. 13 shows a schematic flowchart of a remote program development mediation method in accordance with an embodiment of the present invention.

FIG. 13 shows a schematic flowchart of the remote program development mediation method in accordance with an embodiment of the present invention, and FIGS. 14 to 32 show functions diagrams of individual steps shown in FIG. 13.

Referring to FIGS. 6 and 13, a consignor accesses the homepage of the development hub portal server 201 and requests consignment by inputting consignor information and pieces of information about a program to be consigned for development. Furthermore, the development hub portal server 201 receives the consignor information and a request for the consignment development of the program from the consignor terminal 5 and informs the developer terminal 6 of consignment details in response to consignment approved by the hub manager terminal 3 at step S21.

Figure 14:
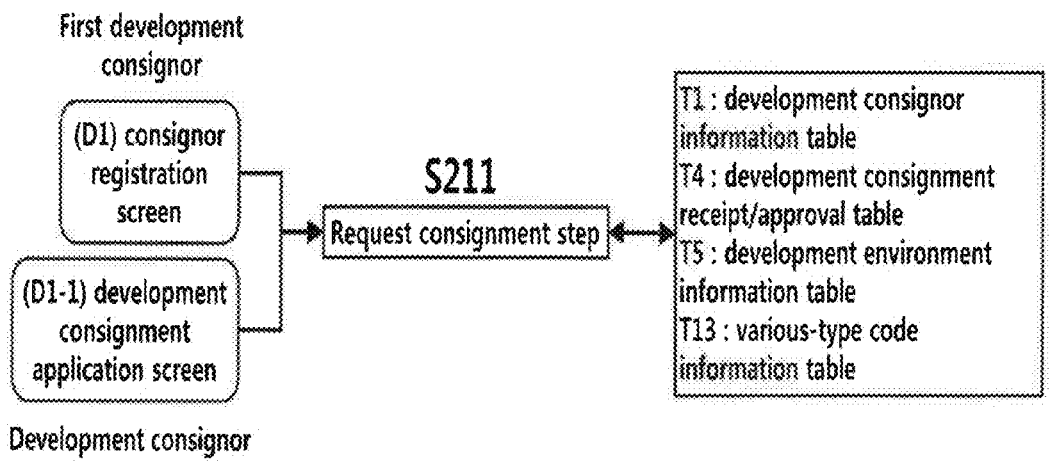

The step (S21) is described in detail with reference to FIG. 14. A development consignor who requests development for the first time registers basic information about the development consignor in a "(D1) consignor registration screen". Registered contents include the items of a "(T1) development consignor information table" (refer to FIGS. 8A-8C). "Last receipt No.", "request number", "rejection number", etc. of the (T1) table are automatically generated by a system. The "last receipt No." is added by 1 whenever a development consignor receives the "last receipt No.", and the "request number" is obtained by subtracting the "consignment rejection number" from the "last receipt No.".

Furthermore, the registered development consignor requests development details in a "(D1-1) development consignment request screen". The basic contents of the development consignment are an item "(T4) development consignment receipt/approval table" (refer to FIGS. 9A-9D). Furthermore, development environment information to be requested is an item "(T5) development environment information table" (refer to FIGS. 9A-9D). The "receipt No." of the (T4) table is automatically assigned by a system by adding 1 to the "last receipt No." of the (T1) table, and items "whether it is approved", "reason of rejection", and "status" are inputted by the hub manager after the hum manager whether consignment is possible or not. The "receipt No." of the (T5) table is also automatically assigned by the system as described above, and other details are requested by dividing the development environment of the "development consignor" into a server part and a client part. For codes necessary for respective tables, reference may be made to "(T13) various-type code information table" (refer to FIG. 12).

As described above, the consignment request module 211 of the development hub portal server 201 provides a development consignor who is a beginner or an existing development consignor with the screens D1 and D1-1 and registers a development consignment request for a program from them, and stores the development consignment request in the DB at step S211.

When the consignment request of the consignor is registered, the consignment determination module 212 provides the consignment information about the consignor to the hub manager terminal 3, registers information about whether consignment has been approved or not, and stores a result in the DB at step S212.

Figure 15:
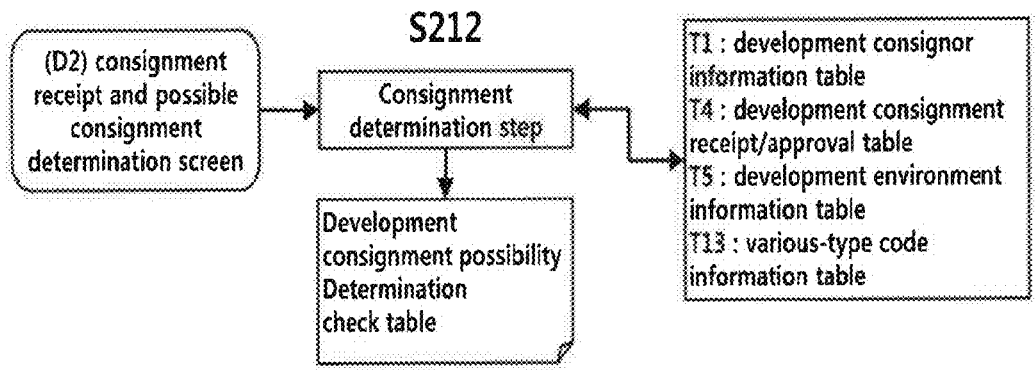

The step S212 is described below in detail with reference to FIG. 15. The hub manager registers a receipt for a development consignment case received through the "(D2) consignment receipt and possible consignment determination screen". The receipt is registered by inputting "G01" to the item "status" of the "(T4) development consignment receipt/approval table". After the receipt is registered, the hub manager determines whether consignment is possible or impossible based on the contents of the "(T5) development environment information table". The hub manager outputs a "development consignment possibility determination check table" that displays items "use development framework", "whether DB I/O exists or not", "development language", "program copy number for each grad", "development period", and "solution used in the server and the client" of the "(T5) table" that has been registered by the consignor, comprehensively reviews the items, and determines whether program consignment is possible or not based on the review results.

The most important part of criteria for determining whether program consignment is possible or not is that a development framework representatively used in the IT industry must be registered in the item "use development framework". If a use development framework does not exist or a framework is a framework that is not representatively used, it is difficult for the developers of a development pool to practically develop a program. For reference, if the development framework is used, a common developer can develop a program of a specific level or higher easily after being educated for the development framework about one day. If, as a result of the determination, it is determined that program consignment is possible, the hub manager inputs "Yes" to the item "whether it is approved" of the (T4) table. If, as a result of the determination, it is determined that program consignment is possible, the hub manager inputs "No." to the item "whether it is approved" of the (T4) table, registers a reason of rejection to the item "reason of rejection", adds 1 to the "rejection number" of the (T1) table, and sets a value obtained by subtracting 1 from the "last receipt No." in a column "request number".

After the hub manager processes whether the consignment request has been approved or not, the consignment notice module 213 informs the consignor terminal of the hub manager's determination for the approval. If the hub manager's determination is approval, the consignment notice module 213 registers the consignment information about the consignor with a bulletin board at step S213.

Figure 16:
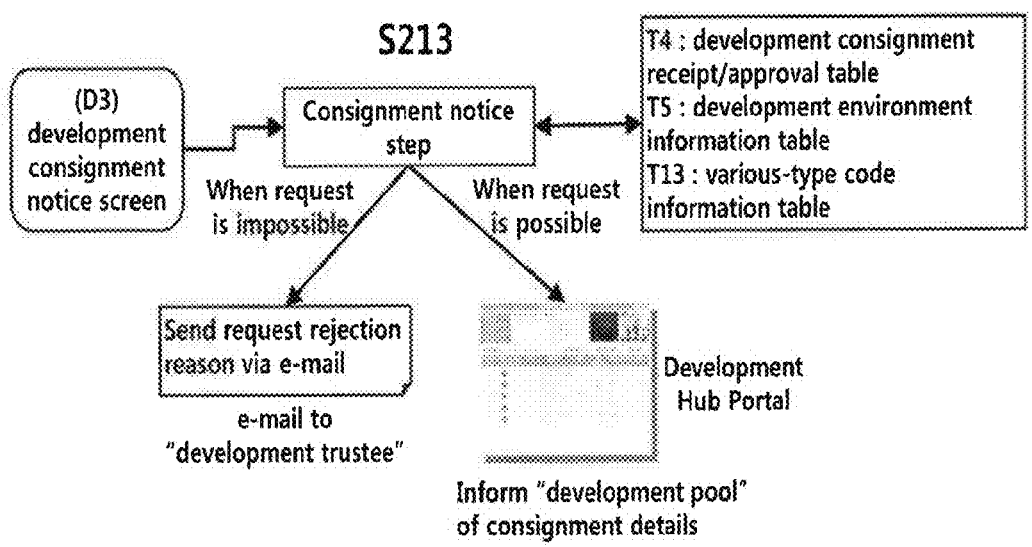

The step S213 is described in detail with reference to FIG. 16. The hub manager informs results regarding whether consignment is possible or not through the "(D3) development consignment notice screen". The informed results are set to "Yes" in the item "whether it is informed" of the (T4) table. If consignment is impossible, the hub manager sends impossible consignment and a reason of rejection to the request e-mail of the (T4) table automatically. If consignment is possible, the hub manager sends request approval details to the request e-mail of the (T4) table through e-mail automatically and informs the entire development pool of the program request details through the bulletin board of the "program development hub". Major notice details include development consignment common contents, a consignment volume, and a development environment.

Referring to FIGS. 6 and 13, after the consignment request of the consignor is informed through the bulletin board, the developer terminal 6 which has accessed the development hub portal server 201 registers information about a development pool including one or more developers and requests the noticed program. Furthermore, the development hub portal server 201 provides the consignor terminal 5 with development evaluation information about the development pool which has provided trust information to the hub manager terminal 3, receives selected trust-determined development pool information, provides approval information to the developer terminal 6, mediates a contract between the consignor and the trust-determined developers, and receives pieces of information about the program, the manager, and the developers that are necessary for development from the consignor terminal 5 and the developer terminal 6 at step S22.

Figure 17:
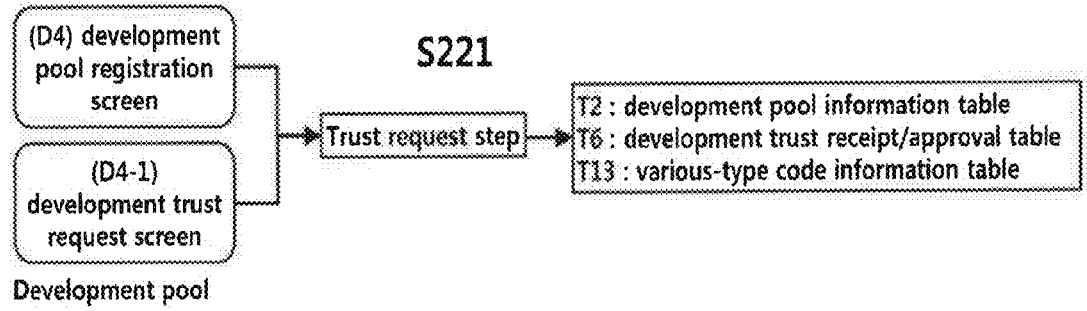

The step S22 is described with reference to FIG. 17. The trust request module 221 of the remote management server 2 registers the development pool information and the trust request of the noticed consignment program development which have been received from the developer terminal 6 and stores them in the DB at step S221.

First, the manager of a development pool who requests development trust for the first time registers basic information about the development pool in the "(D4) development pool registration screen". Contents to be registered include the item "(T2) development pool information table" (refer to FIGS. 8A-8C). The items "last receipt No.", "trust number", and "rejection number" of the (T2) table are automatically generated in the system. The item "last receipt No." is added by 1 whenever the item "development pool" is trust-received. The item "trust number" is obtained by subtracting the item "rejection number" from the "last receipt No.". Furthermore, after development is subsequently completed, the items "problem number", and "trust reliability grade" are processed for the evaluation processing of a consignee.

Next, a developer who is registered with the development pool requests details to be trusted in the "(D4-1) development trust request screen". The basic contents of the development trust to be requested include an item "(T6) development trust receipt/approval table" (refer to FIGS. 9A-9D). The item "receipt No." of the (T6) table is automatically assigned by the system by adding 1 to the item "last receipt No." of the (T2) table. The items "whether it is approved", "reason of rejection", and "status" are inputted by the hub manager after the hub manager determines trust. The item "trust experience" of the (T6) table automatically sets the item "trust number" of the (T2) table. A code necessary for each table is processed with reference to the "(T13) various-type code information table".

After the trust request from the developer is registered, the trust determination module 222 provides trust information about the development pool to the hub manager terminal 3, registers the contents of a received trust receipt, evaluates information about the development history of each development pool regarding a consignment request case, generates development evaluation information having a grade, informs the consignor terminal 5 of the generated development evaluation information, receives information about a trust-determined development pool from the consignor terminal 5, and stores the received information in the DB at step S222.

The step S222 is described in detail with reference to FIG. 18. The hub manager receives and registers the trust case of a received development pool through the "(D5) trust receipt and trust possibility determination screen". The receipt and registration is performed by inputting "IO1" to the item "status" of the "(T6) development trust receipt/approval table". After the receipt and registration, whether trust is possible or impossible may be determined in the "program development hub" through various methods, but in principle the consignor reports and determines the trust request details of "development pool" when taking the projection condition of the consignor into account.

To this end, relevant items are extracted based on the contents of the "(T6) development trust receipt/approval table" and the "(T2) development pool information table", and the "(T3) development pool trust result evaluation table", and the "development trustable determination check table" is outputted. Furthermore, the outputted "development trustable determination check table" is sent to the "development consignor" of the (T4) table via e-mail.

When the trust determination and selection of the consignor is completed, the trust determination approval module 223 sends trust-determined development pool information to the hub manager terminal 3, registers results regarding whether trust determination has been approved or not, and provides approval information and a reason of the approval to the developer terminal 6 at step S223.

Figure 19:
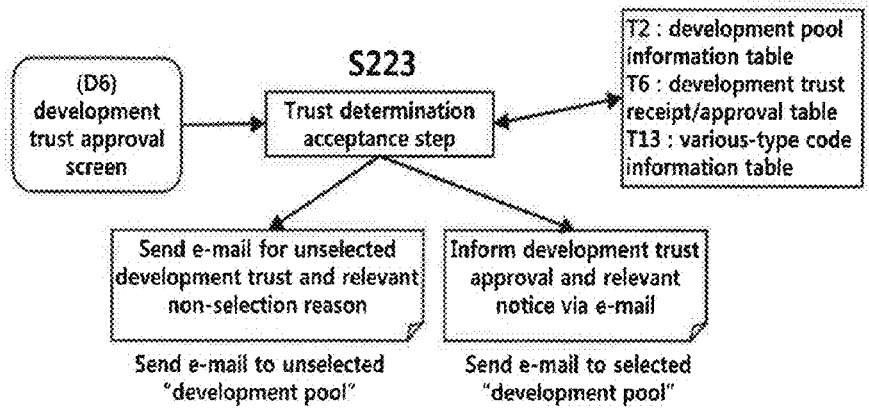

The step S223 is described in detail with reference to FIG. 19. The hub manager receives information about the finally selected development pool from the consignor and registers whether the finally selected development pool has been approved or not through the "(D6) development trust approval screen". Regarding the selected "development pool", the hub manager registers "Yes" to the item "whether it is approved" of the "(T6) development trust receipt/approval table". Regarding unselected "development pools", the hub manager inputs "No." to the item "whether it is approved" of the (T6) table, registers a reason of rejection to the item "reason of rejection", adds 1 to the "rejection number" of the (T2) table, and sets a value obtained by subtracting 1 from the item "last receipt No.", in a column "trust number".

Furthermore, regarding the selected "development pool" and the unselected "development pools", the hub manager informs the contents of trust approval/rejection through the recipient e-mails of the (T6) table. Here, the hub manager informs the selected "development pool" of the selection and guidance contents for a contract and informs the unselected "development pools" of the unselected and guidance contents regarding a reason of non-selection.

After the results of the trust determined approval is informed, the contract mediation module 224 stores information about the contract between the consignor and the developer in the DB, stores a development cost payment schedule and amount according to the payment condition of the contract information in the DB, generates a contract draft, provides the contract draft to the consignor and the developer terminal, registers a contract-related amendment and additional contents which have been received from the consignor and the developer terminal, stores the received contract-related amendment and additional contents in the DB, generates a processed final contract and related data in the form of an image file, and stores the image file in the DB at step S224.

Figure 20:
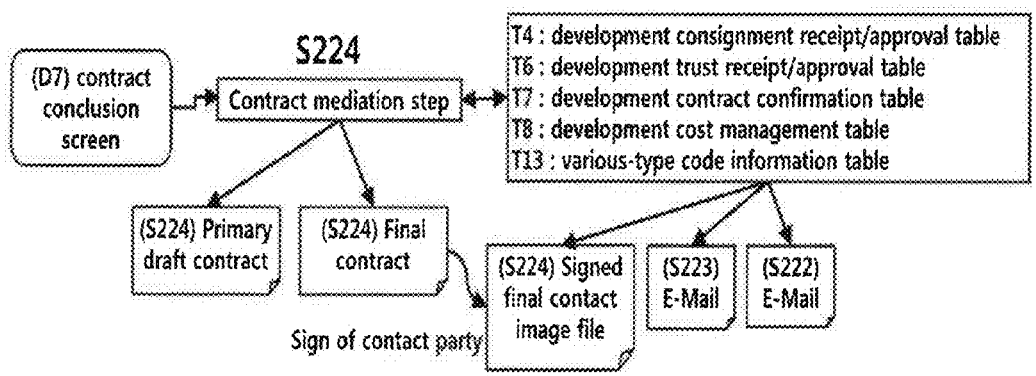

The step S224 is described in detail with reference to FIG. 20. The hub manager generates contract contents through the "(D7) contract conclusion screen". The generated contract contents include an item "(T7) development contract confirmation table" (refer to FIGS. 10A-10C). The contents related to cost payment is an item "(T8) development cost management table" (refer to FIGS. 10A-10C). A contract number in the (T7) table is automatically generated by reading the year of "classification code" in the (T13) table and then adding 1 to the item "code contents". Furthermore, a hub rental fee is set a predetermined ratio (for example, a contract amount x %), and a "trust cost amount paid sum" and a "hub use amount paid sum" are set by the development costs payment module 262. Regarding data for each cost payment date of the (T8) table, the items "scheduled supply date" and "amount to be paid" are automatically generated according to a payment condition based on the items "payment condition", "contract amount", "hub rental fee", and "trust amount" of the (T7) table. The remaining items are set by the development cost demand module 261 and the development costs payment module 262.

Furthermore, the item "planned program copy number" is compared with the scheduled supply date of the (T8) table based on the item "indispensable completion date" of the (T9) table when a target program is registered in the program/manager registration module 225 and is generated based on a result of the comparison. A peculiar point when the (T8) table is generated is that "99999999" may be set in the item "date on which amount will be paid" of the (T8) table and the item "amount to be paid" thereof is empty in preparation for the case where a scheduled payment cost cannot be observed so that the last remainder can be processed.

A "development consignment/trust contract draft" outputted based on the (T7) and (T8) tables is transmitted to the "development consignor" of the (T4) table and the item "development trust pool" of the (T6) table via e-mail so that contract conclusion contents can be checked. The outputted contract draft has columns "consignee bank", "consignee A/C", and "consignee name" empty. After receiving a contract copy via e-mail, the consignor reviews the contents of the contract draft, writes any amendment in the draft, and sends the amended draft to the manager of the item "program development hub" via e-mail.

After receiving the contract copy via e-mail, the item "development trust pool" reviews the contents and writes the items "consignee bank", "consignee A/C", and "consignee name". If there is any amendment, the item "development trust pool" writes the amendment and the written amendment to the hub manager via e-mail. The hub manager inputs the items "consignee bank", "consignee A/C", and "consignee name" of (T7) table based on the received e-mail contents. If there are amended contents, the hub manager supplements the amended contents, outputs the final contract based on the (T7) and (T8) tables, and uses the final contract for a contract. Furthermore, the hub manager generates documents related to an actual and signed contract in the form of an image file using a scanner and inputs an image file name to the item "attachment" of the (T7) table.

When the contract is concluded, the program/manager registration module 225 registers the specifications of a contracted program for each program and information about a development schedule and a manager which have been received from the consignor terminal 5 and stores them in the DB at step S225.

Figure 21:
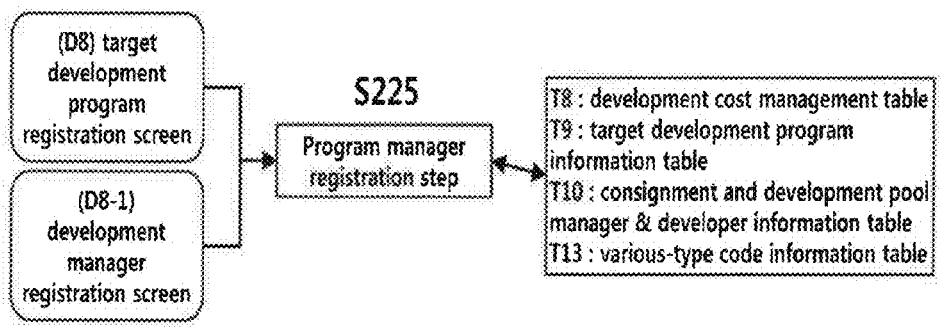

The step S225 is described in detail with reference to FIG. 21. After the contract is concluded, the development consignor registers the details of the program to be developed through the "(D8) target development program registration screen". The registered contents include an item "(T9) target development program information table" (refer to FIGS. 11A-11C). A method of registering the details of the program may be performed through uploading using the Excel sheet depending on many target programs.

The items "developer ID", "development completion date", "test completion date", "whether it is approved", "approval date", and "delay reason" item of the (T9) table are subsequently set by the present development condition registration module 251 and the present development condition query module 252 through schedule management. If the item "indispensable completion date" for each program of the (T9) table corresponds to the item "scheduled supply date" of the record of the (T8) table, 1 is added to the item "planned program copy number" of the record.

Furthermore, the consignor registers information about the manager who will manages each program through the "(D8-1) development manager registration screen". The registered contents include an item "(T10) consignment and development pool manager & developer information table" (refer to FIGS. 11A-11C). The item "manager ID" of the (T10) table is combined with a consignor ID+a personal ID and then registered. The items "use start date" and "use expiration date" of the (T10) table are set when the platform access approval module 241 performs approval processing. The items "last IP" and "recent login date" of the (T10) table store the IP address of a PC used by each user and the date when the user uses the PC when the user logs in to the PC. The item "classification code" of the (T10) table stores classification codes according to a management manager and a responsible person of the "development consignor".

After the program specifications and the manager information are registered, the developer registration module 226 provides the program information to the developer terminal 6, registers information about developers who belong to a development pool, received from the developer terminal 6, and store the information in the DB at step S226.

Figure 22:
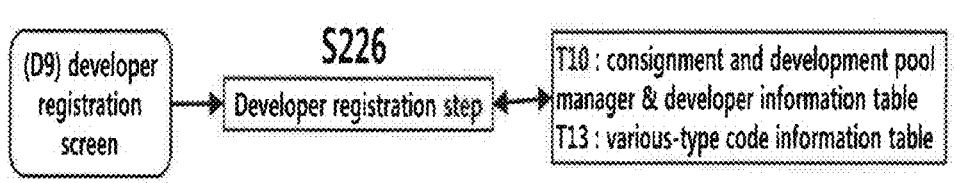

The step S226 is described in detail with reference to FIG. 22. After the contract is concluded, the manager of the development pool registers information about developers who participate in development through the "(D9) developer registration screen". The registered contents includes the item "(T10) consignment and development pool manager & developer information table". The item "developer ID" of the (T10) table is combined with a development pool ID+a personal ID and then registered. The items "use start date" and "use expiration date" of the (T10) table are set when the platform access approval module 241 performs approval processing. The items "last IP" and "recent login date" of the (T10) table store the IP address of a PC used by each developer and the date when the developer uses the PC when the user logs in to the PC. The item "classification code" of the (T10) table stores classification codes according to a management manager and a responsible person of the "development consignor".

Referring to FIGS. 6 and 13, after the contract is concluded, the virtual development platform server 202 receives a development framework, including a development tool and a development environment necessary for development, from the consignor server 4 and virtually constructs a development environment to be used by the developer terminal 6 at step S23.

The step S23 is described in detail with reference to FIG. 23. The platform configuration module 231 provides information about the development environment of the program to the hub manager terminal 3, receives a development framework necessary for development from the consignor server 4, constructs the virtual development platform server 202 based on the received development framework, and provides the developer terminal 6 as an access test for the virtual development platform server 202 at step S231.

Figure 23:
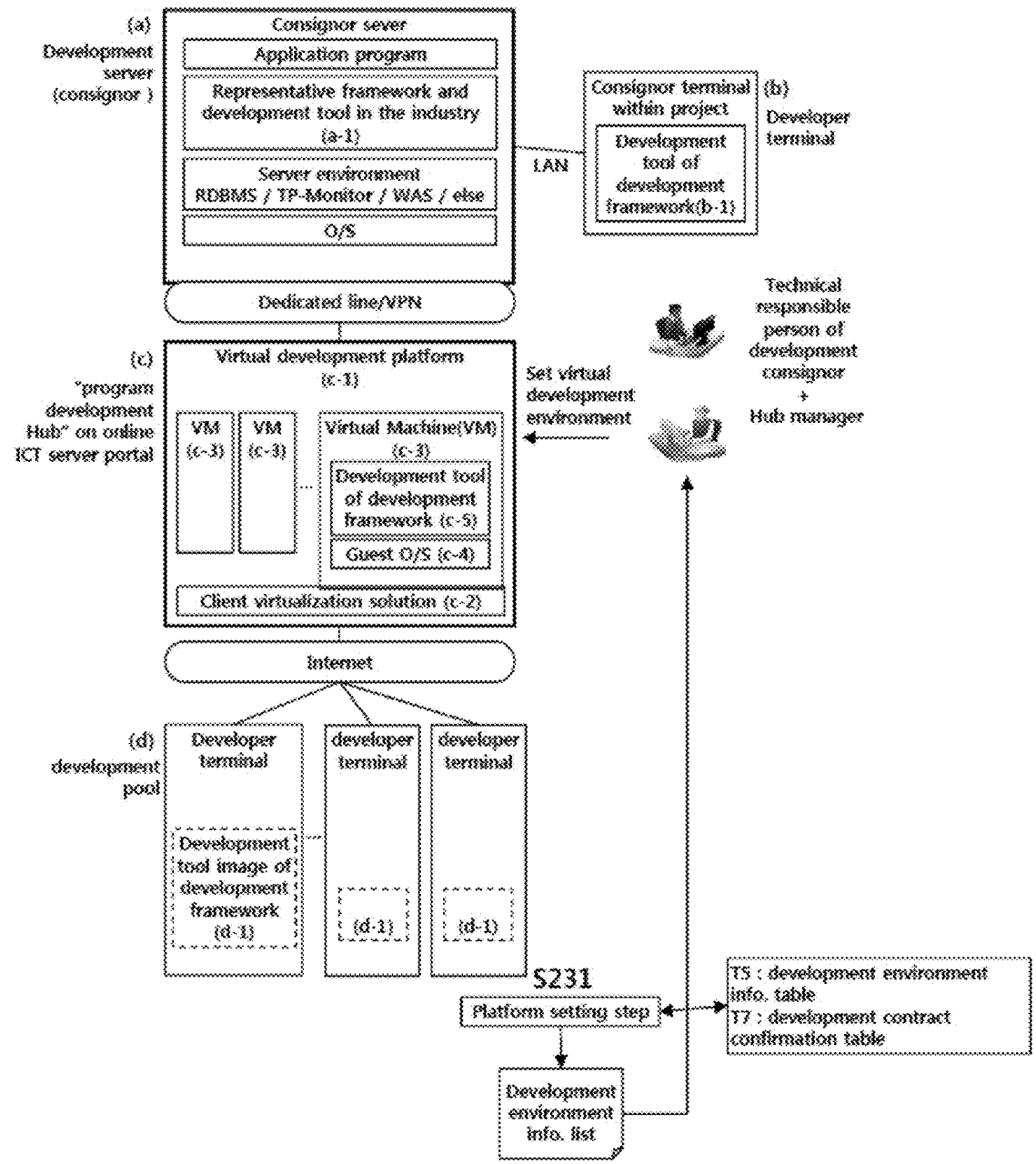

First, the hub manager, together with the technical person in charge of a "development consignor", reviews the consignor development environment, corresponding to (a) and (b) of FIG. 23, based on the "development environment information list" that outputs the contents of the "(T5) development environment information table", constructs a virtual development environment corresponding to (c) of the virtual development platform server 202, performs a test for checking whether or not a virtual development tool corresponding to (d-1) is properly accessed and operated in the development PC of a "development pool" corresponding to (d), and sets an overall development environment based on a result of the test.

A process of the virtual development platform server 202 constructing the virtual development environment corresponding to (c) and the basic contents of the process are as follows. Terms are summarized as in Table 1 in order to help understanding.

TABLE 1

| DESCRIPTION | | TERMS |
|---|---|---|
| Client virtualization solution | Virtualization software | It is installed in the hardware of the virtual development platform server and is configured to control a plurality of OSs. |
| | Virtual machine | It is installed in the hardware and is configured to construct a development environment unique to each developer within a developer OS under the control of virtualization software. |
| | Management software | It provides the session management and distribution functions and the snapshot function of the virtual machine and monitors and manages the virtual machine. |
| | Codec software | It is codec (encoding and decoding) software that provides the developer terminal with a development tool image of the development framework mounted on the virtual machine with high picture quality. |
| | Communication software | It is a communication program installed in the developer terminal and is configured to allow access to the development framework mounted on virtual machine of the virtual development platform server. |

A physical server for client virtualization corresponding to (c-1) is installed. The size of the server is determined by the number of remote developers who access the "program development hub". The server of (c-1) is associated with the server 4 of (a) over a network through the "development server access IP address" of the table (T7). The client virtualization solution corresponding to (c-2) is installed. The client virtualization solution is virtualization software that controls a plurality of client OSs on the hardware of the virtual development platform server 202. For example, Xen Server and Xen Desktop Solution, that is, Hypervisors of Citrix Co., Ltd. may be installed. A Virtual Machine (VM) corresponding to (c-3) is installed. A guest O/S (i.e., an OS used as a client environment) corresponds to (c-4) within the VM is installed. In general, the guest O/S is installed within Windows O/S. A development tool that is included in a representative development framework in the industry which is used in a project corresponding to (c-5) within the VM is downloaded from (a-1) and then installed. Here, various types of pieces of information about directories, files, and others which are necessary for the development tool are set. Other pieces of necessary S/W are installed based on the "development environment information list" that outputs the contents of the "(T5) development environment information table". Pieces of S/W, such as Power point, Excel, and Word which are chiefly used in the industry in order to view documents, such as various types of specifications, are also installed. After one VM is configured, the VM is copied as many as the number of developers by using a provisioning function within the virtualization solution. Here, the number of VMs equal to the item "the number of possible simultaneous developers" of the items of the "(T5) development environment information table" is installed. Meanwhile, programs, such as those in Table 2 bellow, are installed in the development framework constructed in the virtual development platform server 202 as described above.

TABLE 2

| TERMS | | DESCRIPTION |
|---|---|---|
| Application development framework | Development tool | It is a program in which a development-dedicated editor that enables a program to be completed when developers forcibly observe development standards defined by a consignor and develop only business logic, standard programs, standard input and output packets, common system modules, common business modules, compilers, and builders and debuggers are integrated. The program is customized for each consignor because a development environment, development standards, and business are different for each consignor. |
| | Test tool | It is a program that manages development quality by writing test data, supporting a test, performing an actual test, and checking program codes so that a consignor and developers can perform a test for a program in real time. |

After the virtual development environment within the "program development hub" corresponding to (c) is set, the development pool, together with the manager of the "development pool", performs a test regarding whether the developers of the "development pool" may use the virtual development environment or not. Here, (d-1) is not installed in the PC of the developer, but is a concept of a virtual development tool in which only an image of (c-5) is seen by the PC of the developer. That is, (d-1) is a virtualization image of (c-5).

Figure 1:
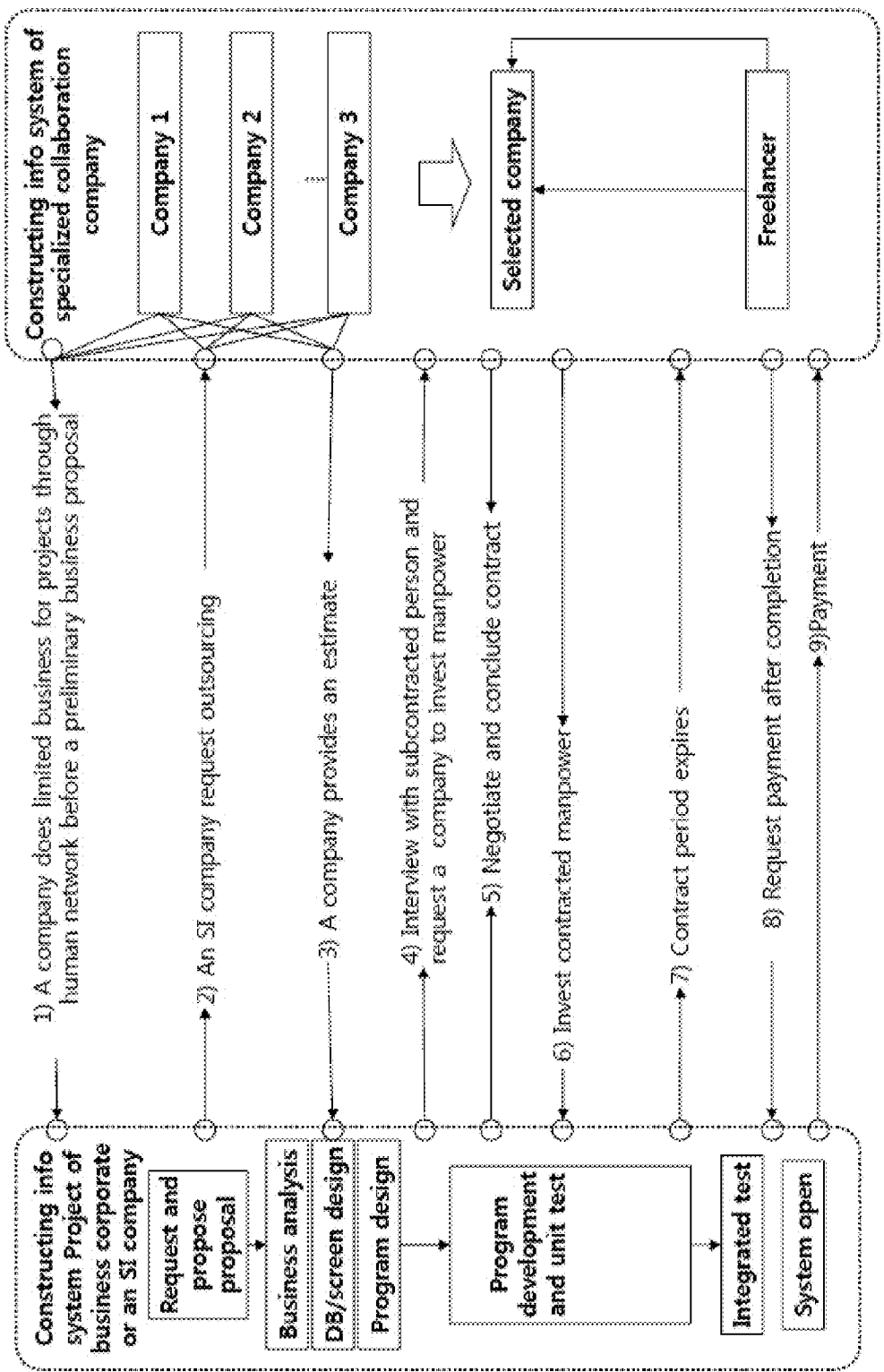
FIGS. 1 and 2 are conceptual diagrams of a conventional program development system.
Figure 2:
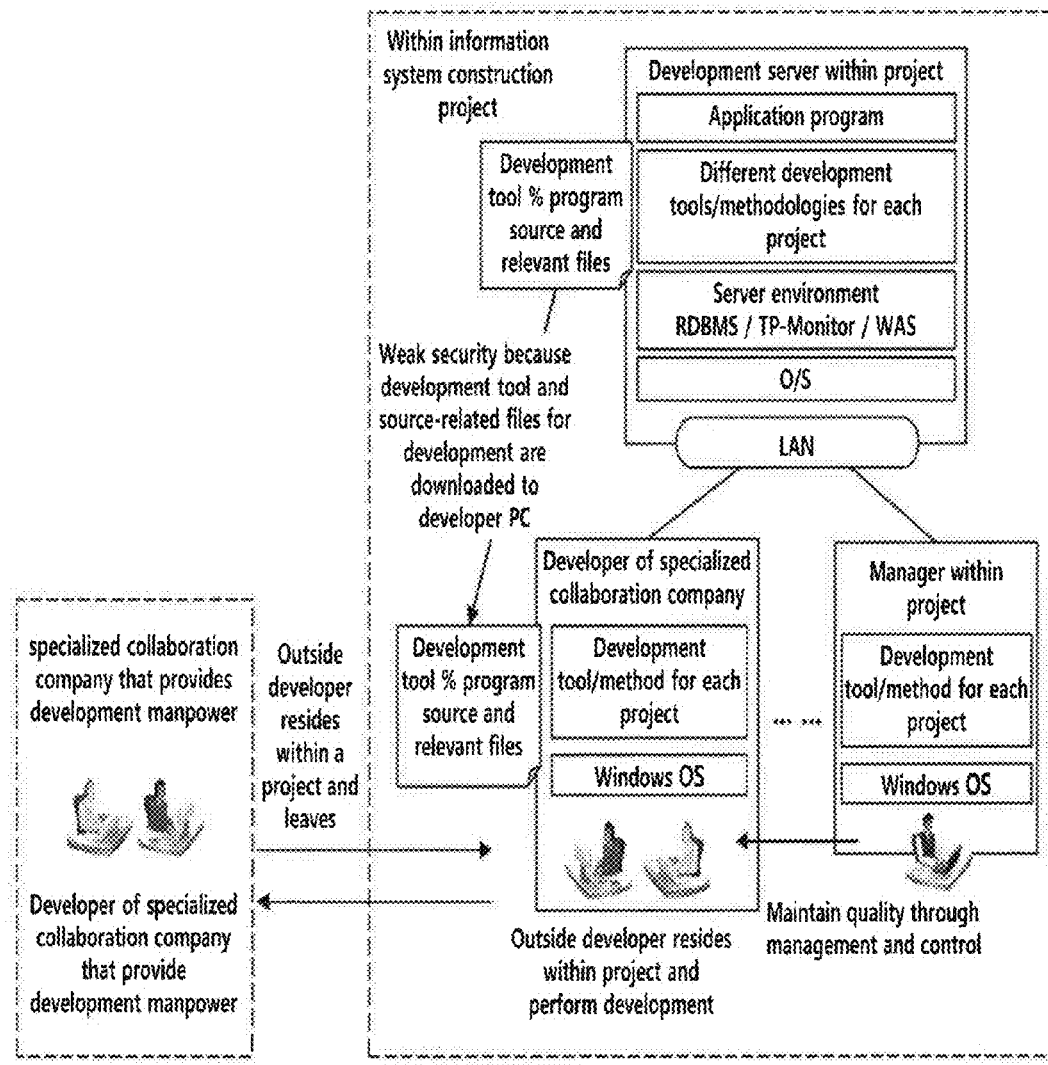

The reason why the developers of the "development pool" can perform development at remote places as described above is as follows. In most of the existing projects, as in FIGS. 1 and 2, the developers of a specialized collaboration company are inputted to a project, a development tool and a development environment included in a development framework are installed in developer PCs, various types of program sources and specifications and relevant files are downloaded, and development is performed. In this case, when outside order developers leave the project, development know-how is frequently drained. In order to prevent this problem, various methods are used, but are not satisfactory. However, as in FIG. 23, when the virtual development platform server 202 is constructed using the "client virtualization solution(c-2)" that appear in the IT industry nowadays and the PCs (d) of the developers are associated with the virtualization server (c), any S/W, such as the development tool (c-5) of a development framework, relevant program sources, specifications, and relevant files within the virtualization server are not downloaded onto the PC of the developers, but only an image corresponding to the virtual development tool (d-1) is viewed and the same development as that performed by the existing developers in (b) can be performed. Accordingly, although developers do not reside in a project and perform development at remote places, the drainage of development know-how can be fundamentally prevented.

Referring to FIGS. 6 and 13, after the platform configuration is completed, the virtual development platform server 202 provides the development tool image to the logged and accessed developer terminal 6, receives program sources through the development tool image of the developer terminal 6, performs an edition function, stores relevant files including the sources, sends the stored program sources to the consignor server 4, and provides the developer terminal 6 with the response results of program development processes performed as program modules that have been compiled and linked and executable at step S24.

Figure 24:
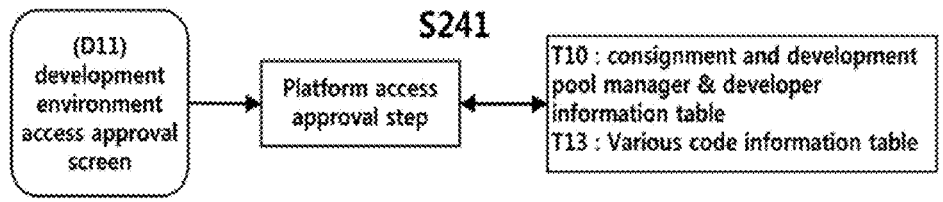

The step S24 is described in detail with reference to FIG. 24. The platform access approval module 241 registers access approval information about the approval of login to the virtual development platform server 202, received from the developer terminal 6 of the developer pool, and stores the access approval information in the DB.

First, the hub manager sets the virtual development environment and finishes an environment test along with a technician on the consignor side. Next, the hub manager registers access approval information indicating that development may be performed through the "(D11) development environment access approval screen". The access approval information is registered by setting a date in the items "use start date" and "use expiration date" of the "(T10) consignment and development pool manager & developer information table" for each manager and responsible person of the consignor and each manager and developer of the "development pool".

Next, if a current system date does not fall within a range of the items "use start date" and "use expiration date" when a developer logs in, the developer should not access the platform.

After access to the platform is approved, the development progress module 242 receives login information from the developer terminal 6 and approves the access to the platform. The virtual development platform server 202 provides the development tool image to the developer terminal 6 of the approved developer, receives the program sources through the development tool image displayed in the developer terminal 6, performs an edition function, stores relevant files including the sources, sends the stored program sources to the consignor server 4, and provides the response results of program development processes performed as program modules that have been compiled and linked and executable to the developer terminal 6, thereby supporting the program development remotely at step S242.

Figure 25:
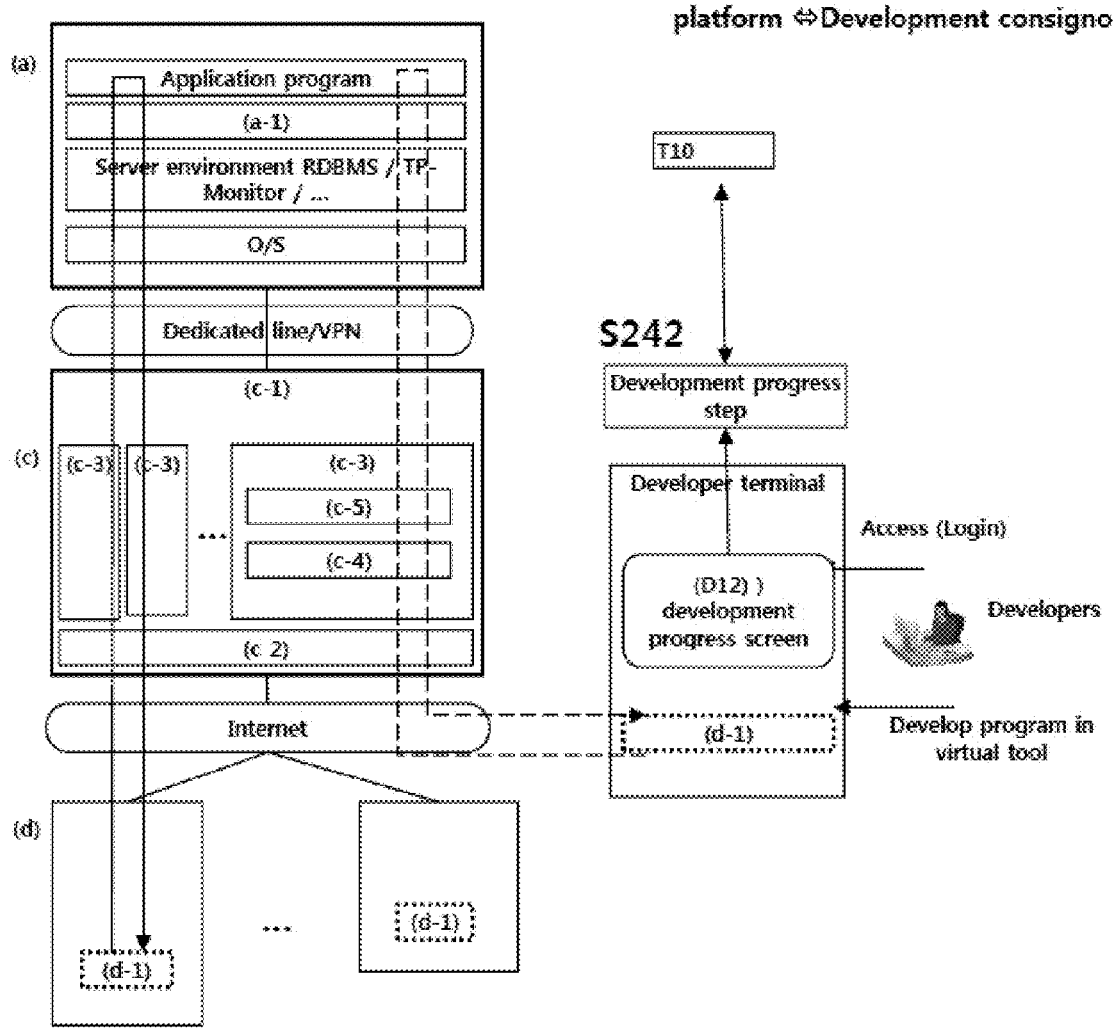

The step S242 is described in detail with reference to FIG. 25. The developers of the development pool log in to the virtual development platform server 202 for actual development in the "(D12) development progress screen". The developers inputs "consignor ID+receipt No." assigned to the project and "development ID+password" assigned to each developer. If there is a code corresponds to the (T10) table and a date at the time of login falls within a range of the items "use start date" and "use expiration date", the developers are allowed for access, and they can register and search for various pieces of information, such as a program development and development progress bulletin board, in the "program development hub" portal.

When a developer presses an icon "program development" in order to develop an actual program, the developer accesses the actual development server 4 of the "development consignor" through the virtual development environment installed in the virtual development platform server 202 and performs development.

A detailed procedure of a developer of the "development pool" performs "program development" using a virtual development tool is as follows.

1) When the developer presses the icon "program development", the "development tool" included in the "development framework" provided by the consignor within the virtual development environment of the virtual development platform server 202 appears in the PC of the developer within the development pool. Here, the "development tool" appearing in the PC of the developer is not downloaded and installed in the PC of the developer, but is a virtual screen on which only an image of the development tool is viewed without anything installed in the PC of the developer.

2) Next, the developer of the "development pool" fetches a standard sample program through a development editor, provided by the "virtual development tool", according to a development procedure and method instructed through the "development consignor" and the "program development hub".

3) The developer develops a program assigned thereto based on the standard sample program. Here, the developer can easily develop the program by developing only pure business logic on the basis of various types of common business and systematic modules provided by the development framework.

4) The source of the developed program is compiled using a compiler provided through the "virtual development tool", and program errors are corrected and supplemented.

5) After compilation is correctly performed, an execution file for executing the program is produced by using a build function provided by the "virtual development tool".

6) Finally, an actual program is executed through a test function for each program which is provided by the "virtual development tool", thereby completing one program development.

Consequently, if only program development languages, such as C or JAVA chiefly used in the industry, are known, the remote developers of the "development pool" can develop a program of a schedule level or higher by simply developing only pure business logic regions without a high degree of technology and perform a test for the program by using various types of predetermined modules of the development framework.

Referring to FIGS. 6 and 13, the consignor server 4 provides service for testing individual programs at the request of a developer through the consignor terminal 5 or the virtual development platform server 202. While providing the test, the development hub portal server 201 registers development completion information received from the developer terminal 6, provides information about the development progress of a program to the consignor terminal 5 and the developer terminal 6, and receives development completion approval from the consignor terminal 5 at step S25.

Figure 26:
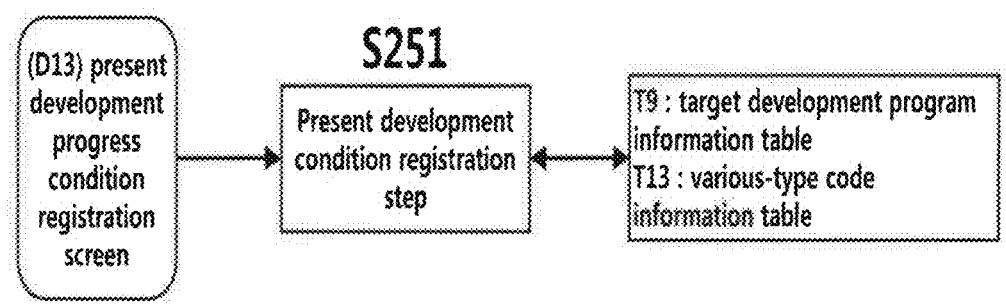

The step S25 is described in detail with reference to FIG. 26. The present development condition registration module 251 registers development completion information for each program which has been received from the developer terminal 6 and stores the development completion information in the DB at step S251.

The developer of the development pool finishes one program development and test at step S242 and registers a development completion date for a developed program through the "(D13) present development progress condition registration screen". The registered contents are registered by inputting his own ID to the item "developer ID" of the "(T9) target development program information table" and a date to the "development completion date" of the "(T9) target development program information table", but registers a development delay reason code to the item "development delay reason" item of the "(T9) target development program information table" if a "development completion date" is later than an "indispensable completion date".

Next, the present development condition query module 252 receives a request for the present development progress condition from the consignor, the hub manager, the development pool manager, and the developer and provides information about the present development condition at step S252.

Figure 27:
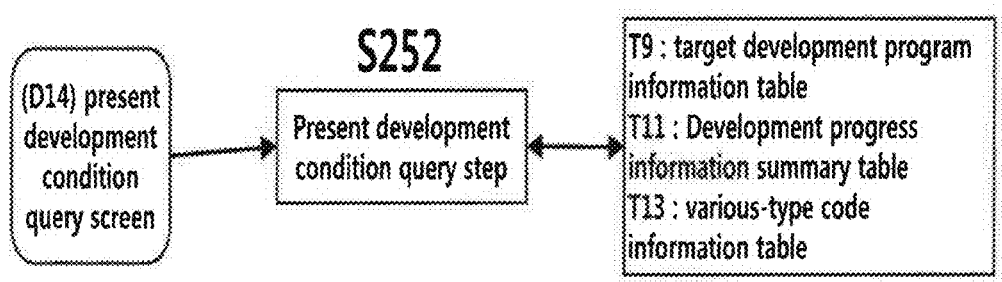

The step S252 is described in detail with reference to FIG. 27. The consignor, the hub manager and the manager and developers of the development pool comprehensively searches for all development progress contents, now being developed in a relevant project, through the "(D14) present development progress condition query screen".

The retrieved contents include whether development and a test for each program now being developed has been completed or not, whether approval has been completed or not, and a reason of development and test delay for each program in the relevant project of the (T9) table. Summary information about the present development progress condition up to a date before the search date for a relevant project can also be searched for through the "(T11) table. Furthermore, a plan versus results for development and a test can be searched for.

A responsible development consignment person or the manager of a development pool searches for summary information. If, as a result of the search, it is determined that the present development progress information is problematic, the responsible development consignment person or the manager may raise an issue and inform it in various types through the "(D16) development progress bulletin board screen".

After development is completed, the development completion approval module 253 provides information about whether a test for each developed program will be performed to the consignor terminal 5, provides service in which the consignor terminal 5 can access the consignor server 4 and perform the test, registers pieces of information about whether the test has been performed or not, whether development completion has been approved or not, and a reason which have been received from the consignor terminal 5, and stores the pieces of information in the DB at step S253.

Figure 28:
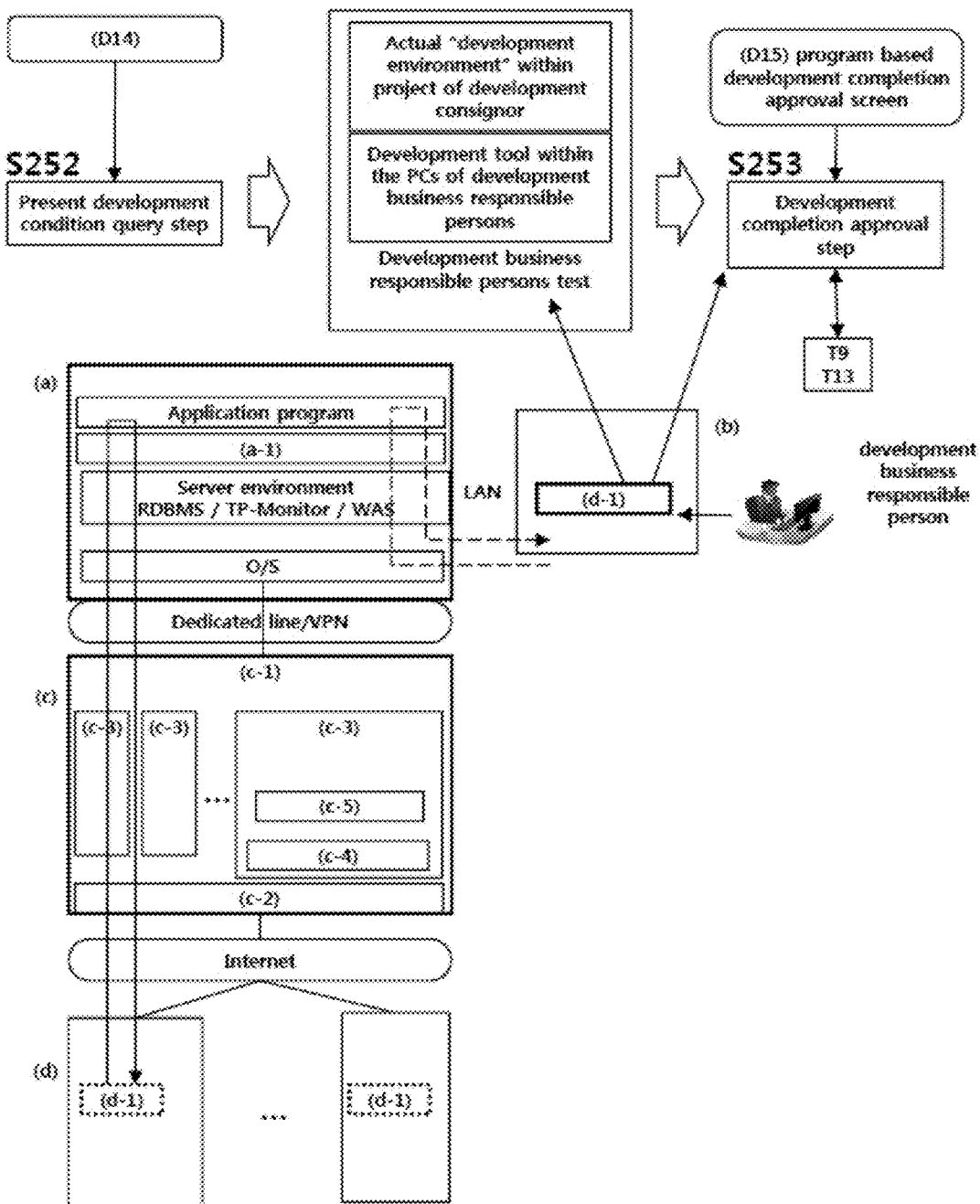

The step S253 is described in detail with reference to FIG. 28. The responsible development business persons of the consignor perform a test for programs whose test has not yet been performed after the developers of the "development pool" search for programs whose development has been completed through the "(D14) present development progress condition query screen" by using an actual "development environment" within the project of the "development consignor" and the actual development tools of the responsible business persons.

If the responsible persons determine that a test has been completed after an actual unit test in their "development tool", the responsible persons register information about whether the test has been performed or not and approval details in the "(D15) program-based development completion approval screen". The registered contents are registered by inputting an ID to the item "responsible person ID" and a date to the item "test completion date" of the "(T9) target development program information table". If a test was performed at a later date (for example, 3 days) than the "development completion date", a test delay reason code is registered in the item "test delay reason" item.

Furthermore, if a test has been completed, the manager or responsible business person of a "development consignment institute" sets "Yes" in the item "whether it is approved" and a date in the item "approval date". If the item "whether it is approved" is set as "Yes", it cannot be cancelled without a conference with the developer of the "development pool".

Meanwhile, in the development progress and management steps S24 and S25, the development progress bulletin board module 254 provide the persons concerned (e.g., a consignor, a hub manager, a development pool manager, and developers) with service for searching for and registering notices and problems in a program development project at step S254.

Figure 29:
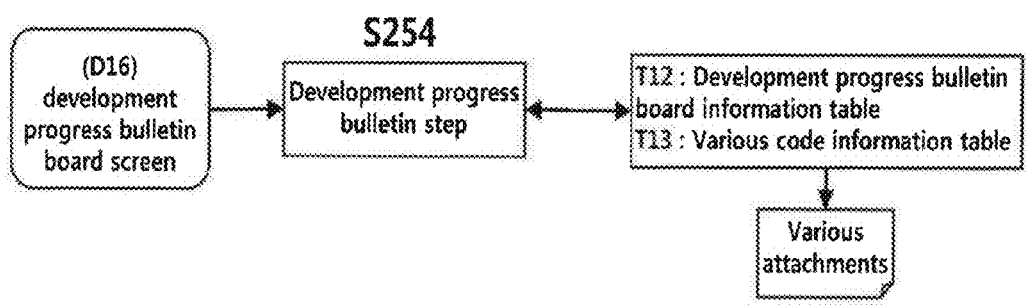

The step S254 is described in detail with reference to FIG. 29. All the persons concerned who participate in a relevant project comprehensively register and search for necessary notices, problems at the time of development, and issues through the "(D16) development progress bulletin board screen".

The registered contents include the items of the "(T12) development progress bulletin board information table". The item "data classification" registers contents, such as notices, problems, and issues, in the form of codes. If an attached file is necessary, "Yes" is set in the item "whether an attached file exists or not" and inputs an actual attached file name to the item "attached file path" item.

The retrieved contents can include pieces of information related to a relevant project, from among the contents of the (T12) table for each query period, and contents of other projects cannot be searched for. OF course, the retrieved contents can be connected to the business of a developer as feedback.

Preferably, in the present invention, in the test process of step S253, an execution capture moving image for a program that has been simulated by the developer terminal 6 can be provided to the consignor terminal 5. Furthermore, a screen of the developer terminal 6 in which development is in progress can be provided to the consignor terminal 5 in real time at the request of the consignor terminal 5.

Referring to FIGS. 6 and 13, after program completion is approved through the test, the development hub portal server 201 mediates the cost payment for the developed program between the consignor and the developer, evaluates automatic execution for the program of the development pool, provides the results of the evaluation to the consignor terminal 5, receives comprehensive evaluation details of the consignor, and evaluates the project execution of the development pool at step S26.

Figure 30:
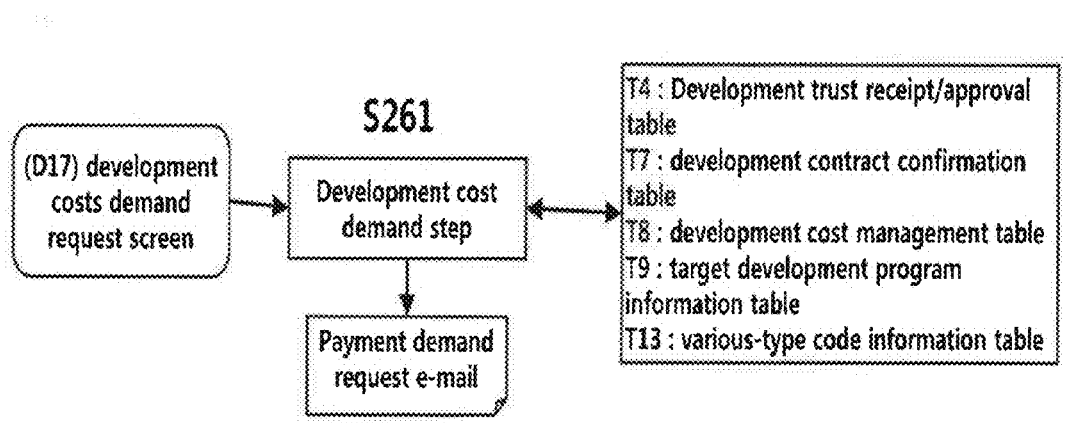

The step S26 is described in detail with reference to FIG. 30. The development cost demand module 261 receives a cost payment request from the developer terminal 6 and informs the consignor terminal 5 of development cost details including information about a development plan versus results.

In calculating the development costs, it is evident that there may be criteria for calculation according to various contract conditions. For example, the manager of a development pool may search for the items "planned program copy number", "result program copy number", "results ratio", and "demand/amount paid" calculated through the "(D17) development costs demand request screen", together with the item "scheduled supply date" of the (T8) table, according to a payment condition when a contract is concluded and then requests the calculated "demand/amount paid" from the consignor via e-mail.

The method of calculating the "demand/amount paid" includes calculating a program copy number corresponding to the item "indispensable completion date" of the (T9) table which is received within the item "scheduled supply date" of the (T8) table corresponding to a plan, calculating a program copy number corresponding to the item "approval date" of the (T9) table which is received within the item "scheduled supply date" of the (T8) table corresponding to results, and, if the plan versus results is 80%, sets 80% in the item "amount to be paid" of the (T8) table as the "demand/amount paid". Here, the item "demand request date" of the (T8) table and the items "planned program copy number", "result program copy number", and "results ratio" item calculated in the calculation process are also set. If the plan versus results are not 100% at a remainder payment date, the manager of a "development pool" demands the remaining amount when the remaining program of the "development pool" is completed. Here, the items "demand request date", "result program copy number", and "demand/amount paid" of records in which the item "scheduled supply date" of the (T8) table has been set to "99999999" are set. Here, the remainder obtained by subtracting a received amount from the item "trust amount" of the table (T7), that is, the total contract amount, is set in the item "demand/amount paid".

Next, the manager of the development pool searches for the item "demand/amount paid" and then sends e-mail details, automatically calculated by the system, to the consignor of the (T4) table via e-mail. Of course, the e-mail details include a "demand request date", a "planned program copy number", a "result program copy number", a "results ratio", and a "demand/amount paid" along with grounds for calculation.

When development costs are requested, the development costs payment module 262 provides information about a development plan versus results and information about development costs at the request of the consignor terminal 5 that is informed of development cost details, registers information about payment results or arrears received from the consignor terminal 5, and stores the information about payment results or arrears in the DB at step S262.

Figure 31:
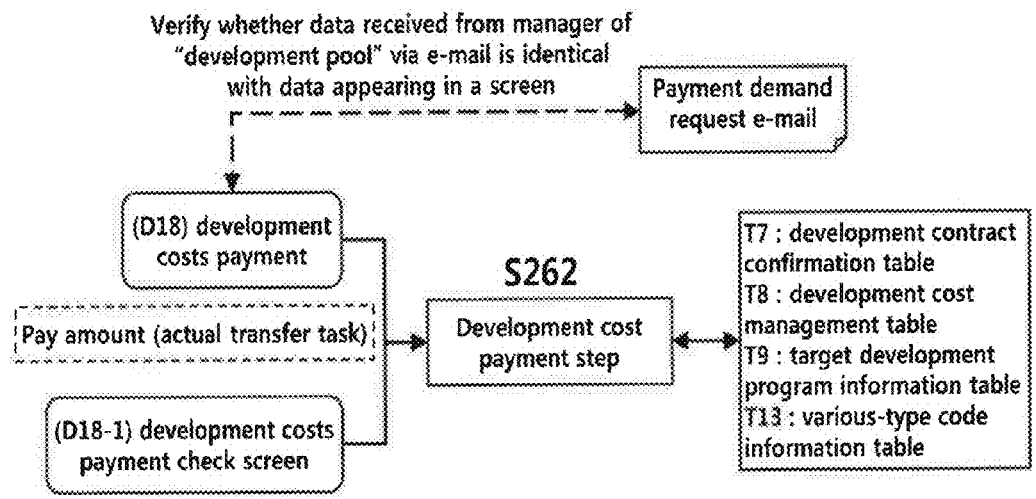

The step S262 is described in detail with reference to FIG. 31. The consignor verifies payment through the "(D18) development costs payment" screen based on the e-mail received from the manager of the "development pool" through the development costs demand step S261, performs payment, and sets cost payment results.

The verification for cost payment is performed by the system based on the (T8) and (T9) tables like in the "demand/amount paid calculation method" of step S261. Results outputted to a screen are compared with the e-mail contents, and if they are identical with each other, it is determined that verification has been performed.

After verification is completed by the consignor, the item "agreed payment date" of the (T8) table is set. Here, the "agreed payment date" must satisfy the item "payment condition" of the table (T7), reading that the payment should not be delayed by a week later than the "demand request date".

The consignor transfers actual development costs to the item "agreed payment date" of the (T8) table based on the items "consignee bank", "consignee A/C", and "consignee name" of the table (T7).

If the actual development costs are not transferred to the item "agreed payment date" of the (T8) table, the consignor may set the items "arrear reason" and "scheduled supply date upon arrears". Here, the arrears are based on the item "payment condition" of the table (T7), such as "arrears are possible within one week once".

After the consignor transfers the development costs, the consignor sets the items "actual payment date" and "whether it is paid" of the (T8) table through the "(D18-1) development costs payment check screen". Here, the "demand/amount paid" of the (T8) table is added to the "trust cost amount paid sum" of the table (T7).

Meanwhile, in a process of paying development costs after development is completed, the development result evaluation module 263 automatically calculates the grades of all programs and a project grade by applying weight to the all the programs and the project grade on the basis of information about whether the deadline of each developed program has been observed or not elapsed days, provides the calculated results to the consignor terminal 5, receives comprehensive evaluation details from the consignor, and stores the project execution evaluation grade of a development pool in the DB at step S263.

Figure 32:
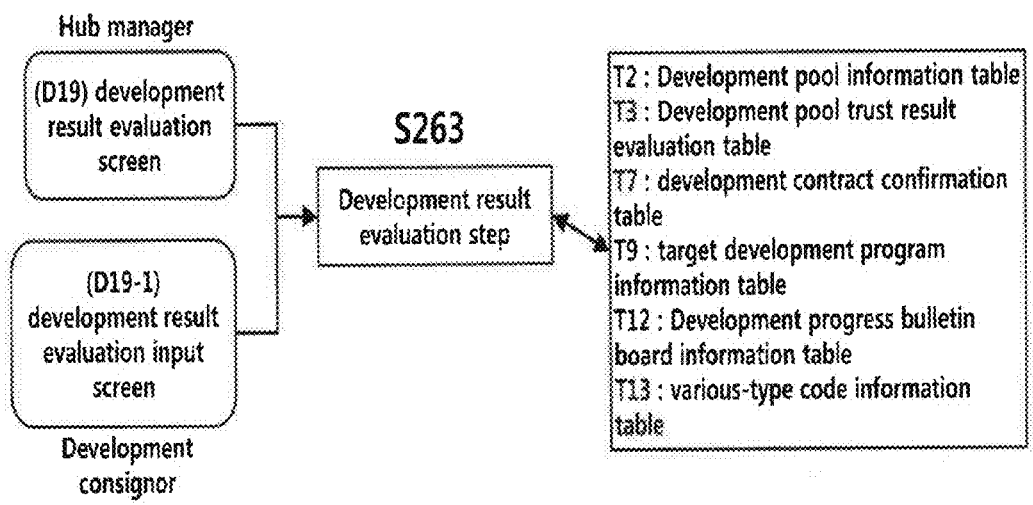

The step S263 is described in detail with reference to FIG. 32. The hub manager automatically evaluates the trust results of a "development pool" for a project whose development has been completed by using the system through a "(D19) development result evaluation screen". The consignor subjectively inputs evaluation results for the development trust results performed by the "development pool" from a viewpoint of a requester through a "(D19-1) development result evaluation input screen" so that other consignors can use the evaluation results as basic data for evaluating the trust ability of the "development pool" when requesting program development.

The hub manager automatically evaluates the development trust results of a development pool using the system. The hub manager evaluates the relevant programs of the (T9) table based on an "indispensable completion date", a "development completion date", and a "test completion date" according to a quality grade, sums the number of programs corresponding to each of grades A, B, C, and D and calculates % for the total program copy number of a relevant project versus each of the grades A, B, C, and D. The hub manager sets the results in the item "evaluation A grade program copy number/%" to the item "evaluation D grade program copy number/%", that is, the automatic evaluation contents of an actual development program of the (T3) table. Furthermore, the hub manager sets the results in the item "total evaluation grade" of the (T3) table.

Next, the development consignor subjectively inputs comprehensive evaluation results for development trust results, performed by the "development pool", through the (D19-1) screen from a viewpoint of a requester. Here, the development consignor inputs contents "evaluation results" and "development trust evaluation summary", that is, the development consignor evaluation contents of the (T3) table with reference to "evaluation A~D grade %" and "total evaluation grade" of the (T3) table which have been automatically calculated by the system. Furthermore, the system automatically sums the three "evaluation results of the (T3) table recently performed by a relevant "development pool" and sets an average evaluation value of the summed values in the item "trust reliability grade" of the (T2) table.

As described above, in accordance with the present invention, when a consignor requests a plurality of development pools to develop programs, a chronic difficulty to secure developers can be solved, and developers can develop programs remotely. Accordingly, since the silver generation who has graduated from university IT lessons and has engaged in the IT industry and overseas manpower can be easily utilized, the difficulty to secure developers can be solved and new works can be created.

Furthermore, a program of high quality can be developed because the development environment of a developer is constructed in the virtualization server and a program is developed through a development framework, and information security can be maintained because a virtual development environment does not provide information about the development of a program to a developer terminal.

Furthermore, a consignor informs a program development contract of a plurality of development pools and calculates costs based on criteria for calculating a grade based on the degree of difficulty of a program not based on the grade of a developer. Accordingly, costs can be effectively calculated.

As described above, the embodiments of the remote program development mediation system and method for mediating a program development contract and the development of a program using the virtual development environment of a client have been described. While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A remote program development mediation system for mediating a program development contract between a consignor and a developer using wired and wireless networks and providing a developer terminal with a virtual development function of a program, the remote program development mediation system comprising:

a development hub portal server configured to provide a homepage, register a consignment request of the consignor and trust requests of development pools, mediate a program development contract and cost payment between the consignor and a selected development pool, provide information about a program development progress performed by the development pool, perform development execution evaluation processing of the development pool, and perform login access of the developer terminal;

a virtual development platform server configured to receive a development framework, comprising a development tool and a development environment, from a consignor server, construct a virtual development environment based on a virtual machine to be sued by the developer terminal, provide a development tool image of the virtualized development framework to a developer terminal that has logged in and accessed the virtual development platform server through a development hub portal server, store relevant files including program sources written through the developer terminal and the development tool image, request the consignor server to generate an execution program and test the execution program by sending a source program to the consignor server, provide processing results to the developer terminal, and perform the virtual development function of the developer terminal;

a hub manager terminal configured to mediate the contract by approving the consignment request of the consignor and the trust request of the development pool through the development hub portal server and set a remote service environment of the development framework in the virtual development platform server based on information about program development, the development framework of the consignor, and the client virtualization solution;

a consignor server configured to provide the development framework of the consignor to the virtual development platform server, receive the source program from the virtual development platform server at the request of the developer terminal, generate the execution program based on the received source program, and perform a test and provide results at the request of a consignor terminal and the developer terminal that has accessed the virtual development platform server;

the consignor terminal configured to request the consignment from the development hub portal server, receive information about an approved developer pool from a hub manager, select a trust target based on the received information, monitor the development progress process of a developer in real time, access the consignor server, perform a test for the program in real time, and registers results of the test with the development hub portal server; and a developer terminal configured to search the development hub portal server for approved consignment information, request trust based on the retrieved approved consignment information, receive remote service and virtual development function of the development framework from the virtual development platform server, remotely develop and test a program using only a screen input and output function, and register results of the development with the development hub portal server.

2. The remote program development mediation system as claimed in claim 1, wherein the development hub portal server comprises:
- a consignment request module for receiving information about the consignor, development consignment information, information about the development environment from the consignor terminal and storing the received information in a DB;
- a consignment determination module for providing information about consigmnent of the consignor to the hub manager terminal, registering consignment receipt received from the hub manager terminal, providing the hub manager terminal with consignment possibility information obtained by analyzing the information about the development environment of the consignor, registering information about whether the consignment has been approved or not which has been received from the hub manager terminal, and storing the information in the DB; and
- a consignment notice module for informing, the consignor terminal of information about whether the hub manager has approved the consignment or not and informing the information about the consignment of the consignor through a bulletin board if the hub manager has approved the consignment.

3. The remote program development mediation system as claimed in claim 2, wherein the development hub portal server comprises:
- a trust request module for receiving information about the development pool and a trust request of a noticed consignment program development from the developer terminal and storing the received information in the DB;
- a trust determination module for providing information about the trust of the development pool to the hub manager terminal, registering trust receipt contents received from the hub manager terminal, evaluating information about development histories of the development pools which have requested trust for a consignment request case, generating development evaluation information having grade, informing the consignor terminal of the generated development evaluation information, receiving trust-determined development information selected by the consignor terminal, and storing the received trust-determined development information in the DB;
- a trust determination approval module for sending information about the trust-determined development pool to the hub manager terminal, registering information about whether the determination has been approved or not, and providing approval information and a reason to the developer terminal;
- a contract mediation module for storing the contract information between the consignor and the developer in the DB, storing a development cost payment schedule and amount, generated according to a payment condition of the contract information, in the DB, generating a contract draft, providing the generated contract draft to the consignor terminal and the developer terminal, registering an amendment to the contract and additional contents received from the consignor terminal and the developer terminal, storing the amendment and the additional contents in the DB, generating a concluded final contract and relevant files in a form of an image file, and storing the image file in the DB;
- a program and manager registration module for registering specifications for each program, information about the development schedule, and information about a manager for the contract concluded program which have been received from the consignor terminal and storing the specifications, the information about the development schedule, and the information about the manager in the DB; and
- a developer registration module for registering information about developers belonging to a development pool which has been received from the developer terminal and storing the information about the developers in the DB.

4. The remote program development mediation system as claimed in claim 1, wherein the development hub portal server comprises:
- a present development condition registration module for registering development completion information for each program which has been received from the developer terminal and storing the development completion information in the DB;
- a present development condition query module for receiving a request to search for a present development progress condition from the consignor, the hub manager, the development pool manager, and the developer, providing information about the present development condition, providing the consignor terminal with an execution capture moving image of a program tested by the developer terminal, and providing a screen of the developer terminal that performs a development progress at the request of the consignor to the consignor terminal in real time;
- a development completion approval module for providing the consignor terminal with information about whether each developed program has been tested or not, accessing the consignor server, registering information about whether a test has been performed or not, whether development completion has been approved or not, and a reason which have been received from the consignor terminal that has performed the test, and storing the received information in the DB; and
- a development progress bulletin board module for registering notices occurring in a program development project and problems upon development which have been received from the consignor, the hub manager, the development pool manager, and the developer and providing search service.

5. The remote program development mediation system as claimed in claim 4, wherein the development hub portal server comprises:
- a development cost demand module for receiving a cost payment request from the developer terminal and informing the consignor terminal of development cost demand details including a development plan versus result information;
- a development cost payment module for providing information about the development plan versus result and information about development costs at the request of the consignor terminal that has received the development cost demand details, registering information about payment results or arrears received from the consignor terminal, storing the received information in the DB; and
- a development result evaluation module for automatically calculating grades of all programs and grades of projects based on information about whether a deadline of each developed program has been observed or not and elapsed days by applying weight to all the programs and projects, providing results of the calculation to the consignor terminal, receiving comprehensive evaluation details of the consignor, and storing a project execution evaluation grade of each development pool in the DB.

6. A remote program development mediation system in which a virtual development platform server provides a developer terminal with remote service of a development framework and develops a program for a consignor server in a virtual development environment, wherein the virtual development platform server comprises:

a platform configuration module configured to set a remote service environment of the development framework by installing virtualization software for controlling a plurality of OSs in order to provide an independent development environment to each developer of a development pool according to setting of a manager of the virtual development platform server, installing a virtual machine for each developer on the installed virtualization software, installing a client OS in each virtual machine, installing an application development framework, environment tiles, and consignor server access information, received from a consignor server, on the OS, and providing the developer terminal with communication software installed in the developer terminal and then to set a virtual development function for developing a program remotely by providing a development tool image to the developer terminal, editing and storing a source program in response to a command received through the development tool image displayed in the developer terminal, sending the source program to the consignor server through a dedicated line, requesting the consignor server to generate an execution program and to test the execution program, receiving processing results from the consignor server, and providing the processing results to the developer terminal; and a development progress module configuring to approve a login request of the developer terminal, assign a designated virtual machine to each developer, and perform a virtual development function performed by the development framework of the designated virtual machine according to a request of the developer terminal to develop and test a program.

7. The remote program development mediation system as claimed in claim 1, wherein the virtual development platform server comprises:

virtualization software directly installed in hardware and configured to control a plurality of OSs;

a virtual machine controlled by the virtualization software over the hardware and configured to form a development environment specific to a developer within an operated guest OS;

management software configured to provide session management, a distribution function, and a snapshot function to the virtual machine and monitor and manage the virtual machine; and a client virtualization solution associated with code software for providing the developer terminal with a development tool image of the development framework mounted on the virtual machine with high picture quality, wherein communication software which is an element of a client virtualization solution that enables access to the development framework that is mounted on the virtual machine of the virtual development platform server is installed in the developer terminal.

8. The remote program development mediation system as claimed in claim 1, wherein:

an application development framework is installed and executed in the virtual development platform server, and an application development framework associates and integrates a development tool for integrally providing a development-dedicated editor that enables a program to be completed when developers forcibly observe development standards defined by a consignor and develop only business logic, standard programs, standard input and output packets, common system modules, common business modules, compilers, and builders and debuggers; and a test tool for managing development quality by writing test data, supporting a test, performing an actual test, and checking program codes so that a consignor and developers can perform a test for a program in real time.

9. A remote program development mediation method of mediating a program development contract between a consignor and a developer using wired and wireless networks and providing a developer terminal with a virtual development function of a program, the remote program development mediation method comprising the steps of:

(S21) a development hub portal server registering information about the consignor and a program development consignment request received from a consignor terminal which has accessed a homepage and informing a developer terminal of consignment information when an examination regarding that remote service of a development framework for the registered consignment information is possible is received from a hub manager terminal;

(S22) the development hub portal server registering a trust request received from the developer terminal, providing the consignor terminal with information about development evaluation histories of each development pool that has requested trust, registering information about a trust-determined development pool which has received from the consignor terminal, informing the developer terminal of the registered information, and mediating a contract between a consignor and a developer;

(S23) when the contract is concluded, a virtual development platform server installing virtualization software for controlling a plurality of OSs in order to provide an independent development environment to each developer of a development pool according to setting of a hub manager, installing a virtual machine for each developer over the installed virtualization software, installing a client OS in each virtual machine, installing an application development framework, environment files, and consignor server access information, received from the consignor server, over the OS, providing the developer terminal with communication software installed in the developer terminal, setting a remote service environment of the development framework, and setting a virtual development function;

(S24) the virtual development platform server developing and testing a program remotely by performing a virtual development function of the developer terminal by editing and storing a source program, coded by a developer, sending the source program to the consignor server, requesting the consignor server to generate and test an execution program, and providing processing results to the developer terminal in a process of providing the remote service of the development framework to a logged developer terminal;

(S25) the development hub portal server registering development completion information received from the developer terminal, providing the consignor terminal and the developer terminal with information about the development progress of the program, and registering information about whether development completion has been approved which has been received from the consignor terminal that has accessed the consignor server and performed each program test; and (S26) the development hub portal server mediating a cost payment for a developed program between the consignor and the developer, generating development execution evaluation information about a development pool, providing the development execution evaluation information to the consignor terminal, receiving comprehensive evaluation details of the consignor, and registering a project execution evaluation grade of the development pool.

10. The remote program development mediation method as claimed in claim 9, wherein the step (S21) comprises:
   (S211) a consignment request step of the development hub portal server registering information about the consignor, development consignment information, information about the development environment received from the consignor terminal and storing the received information in a DB;
   (S212) a consignment determination step of the development hub portal server registering information about whether the consignment has been approved or not which has been received from the hub manager terminal and storing the information in the DB; and
   (S213) a consignment notice step of the development hub portal server informing the consignor terminal of information about whether the hub manager has approved the consignment or not and informing the information about the consignment of the consignor through a bulletin board if the hub manager has approved the consignment.

11. The remote program development mediation method as claimed in claim 9, wherein the step (S22) comprises:
   (S221) a trust request step of the development hub portal server receiving information about the development pool and a trust request of a noticed consignment program development from the developer terminal and storing the received information in the DB;
   (S222) a trust determination step of the development hub portal server registering trust receipt contents received from the hub manager terminal, evaluating information about development histories of the development pools which have requested trust for a consignment request case, generating development evaluation information having grade, informing the consignor terminal of the generated development evaluation information, receiving trust-determined development information selected by the consignor terminal, and storing the received trust-determined development information in the DB;
   (S223) a trust determination approval step of the development hub portal server sending information about the trust-determined development pool to the hub manager terminal, registering information about whether the determination has been approved or not, and providing approval information and a reason to the developer terminal;
   (S224) a contract mediation step of the development hub portal server storing the contract information between the consignor and the developer in the DB, storing a development cost payment schedule and amount, generated according to a payment condition of the contract information, in the DB, generating a contract draft, providing the generated contract draft to the consignor terminal and the developer terminal, registering an amendment to the contract and additional contents received from the consignor terminal and the developer terminal, storing the amendment and the additional contents in the DB, generating a concluded final contract and relevant files in a form of an image file, and storing the image file in the DB;
   (S225) a program and manager registration step of the development hub portal server registering specifications for each program, information about the development schedule, and information about a manager for the contract concluded program which have been received from the consignor terminal and storing the specifications, the information about the development schedule, and the information about the manager in the DB; and
   (S226) a developer registration step of the development hub portal server registering information about developers belonging to a development pool which has been received from the developer terminal and storing the information about the developers in the DB.

12. The remote program development mediation method as claimed in claim 9, wherein the step (S25) comprises:
   (S251) a present development condition registration step of the development hub portal server registering development completion information for each program which has been received from the developer terminal and storing the development completion information in the DB;
   (S252) a present development condition query step of the development hub portal server receiving a request to search for a present development progress condition from the consignor, the hub manager, the development pool manager, and the developer, providing information about the present development condition, providing the consignor terminal with an execution capture moving image of a program tested by the developer terminal, and providing a screen of the developer terminal that performs a development progress at the request of the consignor to the consignor terminal in real time;
   (S253) a development completion approval step of the development hub portal server providing the consignor terminal with information about whether each developed program has been tested or not, accessing the consignor server, registering information about whether a test has been performed or not, whether development completion has been approved or not, and a reason which have been received from the consignor terminal that has performed the test, and storing the received information in the DB; and
   (S254) a development progress bulletin board step of the development hub portal server registering notices occurring in a program development project and problems upon development which have been received from the consignor, the huh manager, the development pool manager, and the developer and providing search service.

13. The remote program development mediation method as claimed in claim 9, wherein the step (S26) comprises:
   (S261) a development costs demand step of the development hub portal server receiving a cost payment request from the developer terminal and informing the consignor terminal of development cost demand details including a development plan versus result information;

(S262) a development costs payment step of the development hub portal server providing information about the development plan versus result and information about development costs at the request of the consignor terminal that has received the development cost demand details, registering information about payment results or arrears received from the consignor terminal, storing the received information in the DB; and (S263) a development result evaluation step of the development hub portal server automatically calculating grades of all programs and grades of projects based on information about whether a deadline of each developed program has been observed or not and elapsed days by applying weight to all the programs and projects, providing results of the calculation to the consignor terminal, receiving comprehensive evaluation details of the consignor, and storing a project execution evaluation grade of each development pool in the DB.

14. A remote program development mediation method of a virtual development platform server providing a developer terminal with remote service of a development framework and developing a program for a consignor server in a virtual development environment, the remote program development mediation method comprising the steps of:

the virtual development platform server setting a remote service environment of the development framework by installing virtualization software for controlling a plurality of OSs in order to provide an independent development environment to each developer of a development pool according to setting of a manager of the virtual development platform server, installing a virtual machine for each developer on the installed virtualization software, installing a client OS in each virtual machine, installing an application development framework, environment files, and consignor server access information, received from a consignor server, on the OS, and providing the developer terminal with communication software installed in the developer terminal;

the development framework setting a virtual, development function for developing a program remotely by providing a development tool image to the developer terminal, editing and storing a source program in response to a command received through the development tool image displayed in the developer terminal, sending the source program to the consignor server through a dedicated line, requesting the consignor server to generate an execution program and to test the execution program, receiving processing results from the consignor server, and providing the processing results to the developer terminal; and the virtual development platform server assigning a designated virtual machine to each developer, and performing a virtual development function performed by the development framework of the designated virtual machine according to a request of the developer terminal to develop and test a program.

15. The remote program development mediation method as claimed in claim 9, wherein the virtual development platform server comprises:

virtualization software directly installed in hardware and configured to control a plurality of OSs;

a virtual machine controlled by the virtualization software over the hardware and configured to form a development environment specific to a developer within an operated guest OS;

management software configured to provide session management, a distribution function, and a snapshot function to the virtual machine and monitor and manage the virtual machine; and a client virtualization solution associated with code software for providing the developer terminal with a development tool image of the development framework mounted on the virtual machine with high picture quality, wherein communication software which is an element of a client virtualization solution that enables access to the development framework that is mounted on the virtual machine of the virtual development platform server is installed in the developer terminal.

16. The remote program development mediation method as claimed in claim 9, wherein:

an application development framework is installed and executed in the virtual development platform server, and an application development framework associates and integrates a development tool for integrally providing a development-dedicated editor that enables a program to be completed when developers forcibly observe development standards defined by a consignor and develop only business logic, standard programs, standard input and output packets, common system modules, common business modules, compilers, and builders and debuggers; and a test tool for managing development quality by writing test data, supporting a test, performing an actual test, and checking program codes so that a consignor and developers can perform a test for a program in real time.

17. The remote program development mediation system as claimed in claim 6, wherein the virtual development platform server comprises:

virtualization software directly installed in hardware and configured to control a plurality of OSs;

a virtual machine controlled by the virtualization software over the hardware and configured to form a development environment specific to a developer within an operated guest OS;

management software configured to provide session management, a distribution function, and a snapshot function to the virtual machine and monitor and manage the virtual machine; and a client virtualization solution associated with code software for providing the developer terminal with a development tool image of the development framework mounted on the virtual machine with high picture quality, wherein communication software which is an element of a client virtualization solution that enables access to the development framework that is mounted on the virtual machine of the virtual development platform server is installed in the developer terminal.

18. The remote program development mediation system as claimed in claim 6, wherein:

an application development framework is installed and executed in the virtual development platform server, and an application development framework associates and integrates a development tool for integrally providing a development-dedicated editor that enables a program to be completed when developers forcibly observe development standards defined by a consignor and develop only business logic, standard programs, standard input and output packets, common system modules, common business modules, compilers, and builders and debuggers; and a test tool for managing development quality by writing test data, supporting a test, performing an actual test, and checking program codes so that a consignor and developers can perform a test for a program in real time.

19. The remote program development mediation method as claimed in claim 14, wherein the virtual development platform server comprises:
   virtualization software directly installed in hardware and configured to control a plurality of OSs;
   a virtual machine controlled by the virtualization software over the hardware and configured to form a development environment specific to a developer within an operated guest OS;
   management software configured to provide session management, a distribution function, and a snapshot function to the virtual machine and monitor and manage the virtual machine; and
   a client virtualization solution associated with code software for providing the developer terminal with a development tool image of the development framework mounted on the virtual machine with high picture quality,
   wherein communication software which is an element of a client virtualization solution that enables access to the development framework that is mounted on the virtual machine of the virtual development platform server is installed in the developer terminal.

20. The remote program development mediation method as claimed in claim 14, wherein:
   an application development framework is installed and executed in the virtual development platform server, and
   an application development framework associates and integrates a development tool for integrally providing a development-dedicated editor that enables a program to be completed when developers forcibly observe development standards defined by a consignor and develop only business logic, standard programs, standard input and output packets, common system modules, common business modules, compilers, and builders and debuggers; and a test tool for managing development quality by writing test data, supporting a test, performing an actual test, and checking program codes so that a consignor and developers can perform a test for a program in real time.

* * * * *